United States Patent
Li et al.

(10) Patent No.: US 12,384,972 B2
(45) Date of Patent: Aug. 12, 2025

(54) METHOD AND SYSTEM FOR TREATING WASTE PLASTIC MATERIAL

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Mingfeng Li, Beijing (CN); Liang Zou, Beijing (CN); Zhiqiang Wang, Beijing (CN); Hongwei Li, Beijing (CN); Xiaoli Wei, Beijing (CN); Guofu Xia, Beijing (CN); Run Xu, Beijing (CN); Shuqing Wang, Beijing (CN); Jili Hou, Beijing (CN); Pengfei Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 309 days.

(21) Appl. No.: 18/004,041

(22) PCT Filed: Jun. 30, 2021

(86) PCT No.: PCT/CN2021/103336
§ 371 (c)(1),
(2) Date: Jul. 11, 2023

(87) PCT Pub. No.: WO2022/002091
PCT Pub. Date: Jan. 6, 2022

(65) Prior Publication Data
US 2023/0357644 A1    Nov. 9, 2023

(30) Foreign Application Priority Data

Jun. 30, 2020 (CN) .................. 202010617815.X
Oct. 28, 2020 (CN) .................. 202011171603.X

(51) Int. Cl.
*C10G 1/10* (2006.01)
*B01D 3/40* (2006.01)
*C10G 1/00* (2006.01)

(52) U.S. Cl.
CPC ............... *C10G 1/10* (2013.01); *B01D 3/40* (2013.01); *C10G 1/002* (2013.01);
(Continued)

(58) Field of Classification Search
None
See application file for complete search history.

(56) References Cited

U.S. PATENT DOCUMENTS

| 4,175,211 A | 11/1979 | Chen et al. |
| 5,569,801 A | 10/1996 | de Broqueville |

(Continued)

FOREIGN PATENT DOCUMENTS

| CN | 1061420 A | 5/1992 |
| CN | 1226574 A | 8/1999 |

(Continued)

OTHER PUBLICATIONS

Yang, Cuiding et al.; "Petrochemical Analysis Methods (RIPP test method)"; Science Press; RIPP: 64-90; Year: 1990; pp. 164-167.

*Primary Examiner* — Tam M Nguyen
(74) *Attorney, Agent, or Firm* — NKL Law; Allen Xue

(57) ABSTRACT

A method and system for pretreating waste plastics and a method and system for producing an automotive fuel from waste plastics are provided. The method for pretreating waste plastics includes the steps of: 1) contacting a waste plastic with a pretreating agent and a solvent oil for impurity (Continued)

removal; and 2) subjecting the effluent from step 1) to solid-liquid separation to obtain an insoluble material and an impurity-removed plastic-containing solution. The impurity-removed plastic-containing solution obtained by the method and system for pretreating waste plastics has very low metal content, chlorine content and silicon content.

11 Claims, 2 Drawing Sheets

(52) U.S. Cl.
CPC . *C10G 2300/1003* (2013.01); *C10G 2300/44* (2013.01); *C10G 2300/80* (2013.01)

(56) References Cited

U.S. PATENT DOCUMENTS

| | | | | |
|---|---|---|---|---|
| 2007/0098625 | A1* | 5/2007 | Adams | C10G 1/10 |
| | | | | 423/484 |
| 2007/0173673 | A1* | 7/2007 | Fujimoto | B01J 8/0055 |
| | | | | 422/198 |
| 2019/0084189 | A1* | 3/2019 | Gelencser | C10G 1/10 |
| 2021/0138424 | A1* | 5/2021 | Redeker | C10K 1/18 |
| 2023/0220180 | A1* | 7/2023 | DeBruin | B29B 17/0026 |
| | | | | 521/48.5 |

FOREIGN PATENT DOCUMENTS

| | | |
|---|---|---|
| CN | 202116321 U | 1/2012 |
| CN | 102911396 A | 2/2013 |
| CN | 102911397 A | 2/2013 |
| CN | 102786980 B | 9/2015 |
| CN | 106635115 A | 5/2017 |
| CN | 107746722 A | 3/2018 |
| CN | 107835833 A | 3/2018 |
| CN | 108456328 A | 8/2018 |
| DE | 19653076 A1 | 6/1998 |
| DE | 19927757 A1 | 12/1999 |
| EP | 0850982 A2 | 7/1998 |
| FR | 2878250 A1 | 5/2006 |
| JP | H0559372 A | 3/1993 |
| JP | H0924293 A | 1/1997 |
| JP | 2000006147 A | 1/2000 |
| JP | 2001072794 A | 3/2001 |
| WO | 9851717 A1 | 11/1998 |
| WO | 2017064292 A1 | 4/2017 |

* cited by examiner

METHOD AND SYSTEM FOR TREATING WASTE PLASTIC MATERIAL

CROSS REFERENCE TO RELATED APPLICATIONS

This application is a U.S. national stage entry of PCT international application no. PCT/CN2021/103336, filed on Jun. 30, 2021, which claims the priority of Chinese patent application No. 202010617815.X, titled "Method and system for producing automotive fuels from waste plastics", filed on Jun. 30, 2020, and Chinese patent application No. 202011171603.X, titled "Method and system for pretreating waste plastics", filed on Oct. 28, 2020, the contents of which are incorporated herein by reference in their entirety.

TECHNICAL FIELD

The present application relates to the technical field of solid waste plastic treatment, particularly to method and system for treating waste plastics.

BACKGROUND ART

The development of the plastic industry makes a great contribution to the social development. At present, the annual plastic production capacity of China is as high as about 1.2 hundred million tons, and most of the plastic is discarded into the environment after being used once. According to statistics, the waste plastic yield of China is about 2.4-4.8 million tons/year; about 8 thousand million tons of waste plastics may be existed in natural environment in the year of 2035. Since the time needed for complete degradation of plastics may be 200-500 years, the continuous accumulation of waste plastics not only causes serious environmental pollution, but also influences the ecological balance in the natural environment.

Existing waste plastic treatment technology mainly includes two types, i.e. landfill and incineration, and the landfill treatment occupies a large amount of land, and is easy to cause secondary pollution, and thus cannot solve the problem essentially. However, only about 400 waste incineration power plants capable of treating waste plastics exist in China at present, and if all waste plastics are treated by waste incineration for power generation, more than 1000 waste incineration power plants shall be built, which is obviously infeasible. In addition, the physical recovery process of waste plastics has high cost and low economic value, thereby generating insufficient profit for enterprises, and secondary pollution is easy to be caused in the recovery process, which leads to slower development of waste plastic resource recovery.

The chemical conversion of waste plastics is an effective means for realizing the rapid recovery and conversion of waste plastics, and particularly, thermoplastic waste plastics can obtain oil and gas through a pyrolysis process, so the pyrolysis process is one of the main process paths for the chemical conversion of waste plastics at present.

Chinese patent No. CN106635115B discloses a method and a hydrothermal reaction system for efficiently and cleanly preparing oil from mixed waste plastic garbage, wherein the method comprises the steps of carrying out pyrohydrolysis treatment on the mixed waste plastic garbage by using an alkaline aqueous solution under the conditions including a temperature of 160-300° C. and a pressure of 20-220 bar; the mixed waste plastic garbage comprises one or more of polyethylene (PE), polypropylene (PP) and polystyrene (PS), and PET, and optionally the mixed waste plastic garbage may also comprise polyvinyl chloride (PVC); and separating the aqueous phase from the solid phase in the material obtained after the hydrothermal treatment, and preparing an oil from the separated solid phase. The method avoids the adverse effect of PET and PVC in the mixed waste plastics on the oil quality, can efficiently and cleanly prepare the oil, and can produce products with high added values, such as TA powder or particles and PS recycled plastics.

Chinese patent application No. CN108456328A discloses a method for treating waste plastics, comprising the steps of adding waste plastics, a modified catalyst and a reaction solvent into a catalytic cracking reactor, uniformly mixing, and then carrying out a catalytic cracking reaction, wherein the modified catalyst is a HZSM-5 and HY composite molecular sieve catalyst modified by a modifier oxide, the modifier is one or more selected from the group consisting of Sn, Fe, Ti and Zn, the reaction solvent is a mixture of tetralin and n-hexadecane, and the catalytic cracking conditions include: a reaction temperature of 150-300° C., a reaction time of 120-240 minutes, a reaction carried out under stirring at a speed of 600-1000 rpm, and an introduction of hydrogen at a hydrogen partial pressure of 4-7 MPa.

Chinese patent No. CN102786980B discloses a method and production line for producing an oil from waste plastics, wherein the method comprises the steps of: 1) pretreating the waste plastics; 2) carrying out a cracking reaction; 3) carrying out a catalytic reaction; 4) condensing; and 5) filtering and water removing. By subjecting waste plastics to oiling treatment, the method can achieve a high oil yield and a low slag rate. The production line comprises a feeding device, a high-frequency electric heating reaction kettle, a catalytic tower, a cooling filter tank, a cooling liquefaction tower and an oil storage tank, wherein the feeding device is connected with the high-frequency electric heating reaction kettle, the high-frequency electric heating reaction kettle is connected with the catalytic tower through a pipeline, the catalytic tower is connected with the cooling filter tank through a pipeline, the cooling filter tank is connected with the cooling liquefaction tower through a pipeline, and the cooling liquefaction tower is connected with the oil storage tank through a pipeline.

Waste plastics have a complex composition and contain a large amount of heteroatoms per se; a large amount of various organic or inorganic additives are further added in the production process of plastics to improve the performance thereof; and a large amount of impurities may easy to adhere to discarded plastics. Due to the above reasons, existing pyrolysis processes mainly have the problem that the quality of pyrolysis oil does not meet the requirements, particularly the content of Cl and Si impurities is high. The Cl in the pyrolysis oil mainly comes from the decomposition of PVC in the waste plastics, most of the Cl is present as small molecular organic chloride, which may be easily decomposed to form HCl in subsequent oil product processing, thereby causing serious corrosion. In prior arts, alkaline substances are mainly adopted for dechlorinating pyrolysis oil, but on one hand, a large amount of solid waste is generated, and on the other hand, PVC is finally converted into inorganic salts such as NaCl, $CaCl_2$) and the like, so that the value of the PVC is essentially reduced. The Si in the pyrolysis oil mainly comes from the decomposition of high molecular additives such as silicone oil, silicone resin, silicone rubber powder and the like, and inorganic additives such as $SiO_2$ and the like, is mainly present as alkyl epoxy silane, is a poison of the catalyst used in subsequent processing, and may cause a permanent deactivation of the catalyst.

Therefore, a new waste plastics treatment technology is still urgently needed to solve the problem of high content of harmful elements Cl and Si in pyrolysis oil produced from waste plastics encountered in prior arts, which would result in corrosion of pipelines and equipment in subsequent processes, and easy deactivation of catalyst.

DISCLOSURE OF THE INVENTION

It is an object of the present application to provide a novel method and system for treating waste plastics that can solve one or more of the problems encountered in the prior art described above.

To achieve the above object, in an aspect, the present application provides a method for pretreating waste plastics, comprising the steps of:

1) contacting a waste plastic with a pretreating agent and a solvent oil for impurity removal, wherein the pretreating agent is selected from humus soil, red mud, waste catalyst from oil-refining unit, kaolin, semicoke, activated carbon, gasification ash and slag or combinations thereof; and
2) subjecting the effluent from step 1) to solid-liquid separation to obtain an insoluble material and an impurity-removed plastic-containing solution.

Preferably, at least a portion of the waste plastic used in step 1) has been subjected to a dechlorination treatment comprising the steps of:

i) dissolving a waste plastic with a first organic solvent selected from tetrahydrofuran, ketone solvents, chlorinated aliphatic hydrocarbons, or combinations thereof; and
ii) subjecting the mixture obtained in step i) to solid-liquid separation to obtain a chlorine-containing solution and a chlorine-removed waste plastic.

In another aspect, the present application provides a waste plastic pretreatment system for carrying out the method for pretreating waste plastics according to the present application, comprising a waste plastic pretreatment unit and a solid-liquid separation unit, wherein the waste plastic pretreatment unit is provided with a waste plastic inlet, an optional chlorine-removed waste plastic inlet, a pretreating agent inlet, a solvent oil inlet, and a pretreatment effluent outlet, the solid-liquid separation unit is provided with an inlet, an insoluble material outlet, and an impurity-removed plastic-containing solution outlet, the pretreatment effluent outlet of the waste plastic pretreatment unit is in communication with the inlet of the solid-liquid separation unit.

Preferably, the waste plastic pretreatment system further comprises a waste plastic dissolution-dechlorination unit provided with a waste plastic inlet, a first organic solvent inlet and a dissolution effluent outlet, and a dechlorination-separation unit provided with an inlet, a chlorine-containing solution outlet and a chlorine-removed waste plastic outlet, the dissolution effluent outlet of the waste plastic dissolution-dechlorination unit is in communication with the inlet of the dechlorination-separation unit, and the chlorine-removed waste plastic outlet of the dechlorination-separation unit is in communication with the chlorine-removed waste plastic inlet of the waste plastic pretreatment unit.

In still another aspect, the present application provides a method for producing an automotive fuel from waste plastics, comprising the steps of:

I) pretreating a waste plastic with the method for pretreating waste plastics or the waste plastic pretreatment system according to the present application to obtain an impurity-removed plastic-containing solution;
II) contacting the impurity-removed plastic-containing solution and an optional catalytic cracking feedstock with a catalytic cracking catalyst for reaction; and
III) separating the reaction product of step II) to obtain a gasoline fraction and/or a diesel fraction.

In yet another aspect, the present application provides a system for carrying out the method for producing an automotive fuel from waste plastics of the present application, comprising a waste plastic pretreatment system according to the present application and a catalytic cracking unit; wherein the catalytic cracking unit is provided with an impurity-removed plastic-containing solution inlet, an optional catalytic cracking feedstock inlet and at least one outlet, and the impurity-removed plastic-containing solution outlet of the solid-liquid separation unit of the waste plastic pretreatment system is in communication with the impurity-removed plastic-containing solution inlet of the catalytic cracking unit.

The method and system for pretreating waste plastics according to the present application can effectively remove metal impurities, chlorine impurities and silicon impurities in waste plastics, and avoid the influence of the metal impurities and the chlorine impurities on subsequent processing units; wherein, the silicon impurities are removed in the original form of the organosilicon polymer added during the processing of the plastics, thereby effectively avoiding the problem of catalyst deactivation in subsequent processing unit. In addition, the method and system for pretreating waste plastics according to the present application have the advantages of small pollution discharge, good environmental protection and reduction in carbon emission during the operation.

The method and system for producing automotive fuel from waste plastics can be used to produce automotive fuel from waste plastics, and thus are beneficial to solving the problem of white pollution, and have good environmental benefit, social benefit and economic benefit.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1:
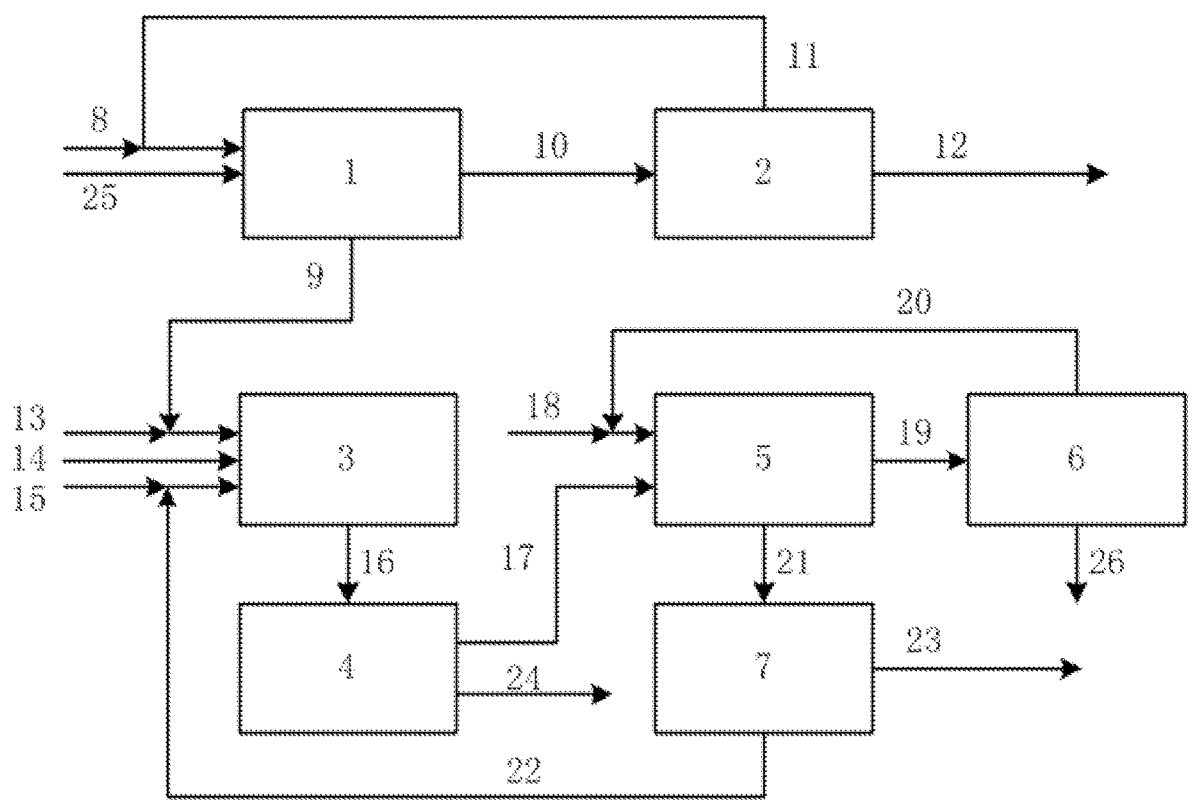
FIG. 1 shows a schematic diagram of a preferred embodiment of the method and system for pretreating waste plastics according to the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

As used herein, the term "humus soil" refers to a mixture formed by various rotted plant matters and organic wastes that is entrained in waste plastics excavated from a landfill.

In the application, the term "semicoke" refers to a solid product generated by pyrolysis of carbonaceous materials such as coal, biomass and waste plastics at a temperature of 350-600° C.

As used herein, the term "gasification ash and slag" refers to a solid residue obtained by a reaction of carbonaceous materials such as coal, semicoke, coke, biomass, petroleum coke, waste plastics, and the like, with a gasifying agent at a temperature above than 600° C. under normal pressure or pressurized conditions.

As used herein, the term "red mud" refers to an industrial solid waste discharged after an extraction of alumina from bauxite.

As used herein, the term "solvent oil" has a meaning well known in the art, which is typically a complex mixture of hydrocarbons. Preferably, the "solvent oil" is a distillate oil rich in aromatic hydrocarbons, and the distillate oil rich in aromatic hydrocarbons may be one of the liquid distillate oils obtained from petroleum processing, coal pyrolysis, direct coal liquefaction, pyrolysis of biomass and/or waste plastics, or a mixture of two or more of the liquid distillate oils.

As used herein, the term "optionally/optional" means that the corresponding step, unit, component or ingredient is not essential but optional, i.e., that said step, unit, component or ingredient may or may not be present.

In the context of the present application, unless otherwise indicated, the reaction pressures and treatment pressures given are all gauge pressures.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

In a first aspect, the present application provides a method for pretreating waste plastics, comprising the steps of:
1) contacting a waste plastic with a pretreating agent and a solvent oil for impurity removal, wherein the pretreating agent is selected from humus soil, red mud, waste catalyst from oil-refining unit, kaolin, semicoke, activated carbon, gasification ash and slag, or combinations thereof, and optionally further comprises an alkaline oxide; and
2) subjecting the effluent from step 1) to solid-liquid separation to obtain an insoluble material and an impurity-removed plastic-containing solution.

In a preferred embodiment, step 1) is carried out at a temperature of 200-450° C.; further preferably, the treatment conditions of step 1) include: a temperature of 250-410° C., a pressure of 0.1-5 MPa, and a time (namely the residence time of the waste plastic) of 10-60 min. In some still further preferred embodiments, the treatment conditions of step 1) include: a temperature of 320-390° C., a pressure of 0.5-4.0 MPa, and a time of 15-45 min. In some other still further preferred embodiments, the treatment conditions of step 1) include: a temperature of 280-390° C., a pressure of 0.1-5 MPa, and a time of 10-30 min.

In a preferred embodiment, the distillation range of the solvent oil used in step 1) is ranging from 80° C. to 550° C., the solvent oil has a total aromatics content of greater than 50 mass % and a monocyclic aromatics content of greater than 20 mass %. Further preferably, the solvent oil has a monocyclic aromatics content of greater than 40 mass %. For example, the solvent oil may be vacuum gas oil (VGO), hydrogenated light cycle oil (HLCO), straight-run diesel (i.e. straight run diesel oil), coal tar, or the like.

In a preferred embodiment, the weight ratio of the solvent oil to the waste plastic in step 1) is from 1:10 to 10:1, more preferably from 1:1 to 7:1.

According to the present application, the pretreating agent used in step 1) may be one of humus soil, red mud, waste catalyst from oil-refining unit, kaolin, semicoke, activated carbon, and gasification ash and slag, or a mixture of two or more of them, and optionally comprises an alkaline oxide. In a preferred embodiment, the pretreating agent used in step 1) is selected from the group consisting of waste catalytic cracking catalysts, humus soil, activated carbon, or combinations thereof, and optionally comprises an alkaline oxide.

In a preferred embodiment, the particle size of the pretreating agent used in step 1) is in a range of 75 to 150 μm; further preferably, the weight ratio of the pretreating agent to the waste plastic in step 1) is 1:10 to 2:1, more preferably 1:7 to 1:5. For example, in some particularly preferred embodiments, the pretreating agent is used in an amount of 1-10 wt %, based on the total weight of the combined material obtained in step 1).

In a preferred embodiment, the waste plastic used in step 1) has been subjected to washing, drying and crushing, so that the crushed waste plastic has a particle size of 1-200 mm, preferably 1-50 mm.

In a preferred embodiment, the operating temperature of the solid-liquid separation of step 2) is 250-410° C.

By employing the carefully selected pretreating agent and solvent oil types, and treatment conditions in the method of the present application, the content of impurities in the resulting impurity-removed plastic-containing solution can be controlled within a desired range to facilitate subsequent further processing and treatment, such as catalytic cracking.

In a preferred embodiment, the impurity-removed plastic-containing solution has a metal content of less than 5 µg/g, a chlorine content of less than 20 µg/g, and a silicon content of less than 3 µg/g; further preferably, the impurity-removed plastic-containing solution has a metal content of less than 5 µg/g, a chlorine content of less than 3 µg/g, and a silicon content of less than 3 µg/g; particularly preferably, the impurity-removed plastic-containing solution has a metal content of less than 3 µg/g, a chlorine content of less than 1 µg/g and a silicon content of less than 1 µg/g.

In a preferred embodiment, at least a portion of the waste plastic used in step 1) has been subjected to a dechlorination treatment comprising the steps of:
  i) dissolving a waste plastic with a first organic solvent selected from tetrahydrofuran, ketone solvents, chlorinated aliphatic hydrocarbons, or combinations thereof; and
  ii) subjecting the mixture obtained in step i) to solid-liquid separation to obtain a chlorine-containing solution and a chlorine-removed waste plastic.

According to this preferred embodiment, the chlorine-containing plastic in the waste plastic is dissolved into the solution by selective dissolution of the waste plastic with the first organic solvent in step i). Where polystyrene is contained in the waste plastic, both the chlorine-containing plastic and polystyrene will be dissolved in the first organic solvent in step i). According to the application, the chlorine-containing plastic may be one or more selected from the group consisting of polyvinyl chloride, polyvinylidene chloride and copolymers thereof.

According to this preferred embodiment, in step i), it is preferred to use a first organic solvent which has a good dissolving effect on the chlorine-containing plastic and a high dissolving efficiency. In a further preferred embodiment, the first organic solvent used in step i) is a mixed solvent of tetrahydrofuran and a ketone solvent at any weight ratio, and it is further preferred that the first organic solvent is a mixed solvent of tetrahydrofuran and a ketone solvent in a weight ratio of 1:3 to 3:1, more preferably 1:2 to 2:1, wherein the ketone solvent is selected from methyl ethyl ketone, methyl isobutyl ketone, cyclohexanone, isophorone, or combinations thereof, preferably selected from methyl ethyl ketone, cyclohexanone, or combinations thereof, and more preferably methyl ethyl ketone.

In a further preferred embodiment, the waste plastic is dissolved in the first organic solvent in step i) at a temperature of 50-100° C. for 30-60 min.

In a further preferred embodiment, the weight ratio of the first organic solvent to the waste plastic used in step i) is from 1:10 to 10:1.

In some further preferred embodiments, the first organic solvent used in step i) has been preheated to a temperature of 40 to 60° C.

In a further preferred embodiment, the operating temperature of the solid-liquid separation of step ii) is 50 to 100° C. Preferably, the chlorine content in the chlorine-removed waste plastic is less than 20 µg/g.

In a further preferred embodiment, the dechlorination treatment further comprises the step of:
  iii) subjecting the chlorine-containing solution obtained in step ii) to a precipitation treatment selected from back-extraction, simple distillation, flash evaporation, rectification or combinations thereof and separation to obtain plastic (e.g. PVC and/or PS) particles and recovered first organic solvent.

In a further preferred embodiment, said precipitation treatment of step iii) is a back-extraction coupled distillation, wherein the back-extractant is water, the back-extraction temperature is 70-100° C. and the distillation temperature is 80-100° C. In some particularly preferred embodiments, after contacting the chlorine-containing solution with the back-extractant water in step iii), dissolved plastic (e.g., PVC and/or PS) will precipitate as solid particles, and the remaining liquid portion will be the first organic solvent comprising water; and after distilling the first organic solvent comprising water to obtain water and recovered first organic solvent, the recovered first organic solvent can be reused. In some particular embodiments, the back-extracted effluent is separated by filtration to obtain plastic (e.g., PVC and/or PS) particles and wastewater comprising organic solvent.

In a preferred embodiment, the method for pretreating waste plastics according to the present application further comprises the steps of:
  3) contacting the insoluble material obtained in step 2) with a second organic solvent for solvent extraction, and subjecting the resulting product to solid-liquid separation to obtain a solid material and a liquid material, wherein the second organic solvent is selected from benzene, toluene, trichloromethane, cyclohexanone, ethyl acetate, butyl acetate, carbon disulfide, tetrahydrofuran, gasoline or combinations thereof;
  4) treating the solid material obtained in step 3) to recover the pretreating agent, and recycling at least a part of the recovered pretreating agent to step 1), wherein the treatment is selected from screening, regeneration, or combinations thereof; and
  5) subjecting the liquid material obtained in step 3) to a precipitation treatment and separation to obtain solid plastic particles and recovered second organic solvent, wherein the precipitation treatment is selected from back-extraction, simple distillation, flash evaporation, rectification or combinations thereof.

Waste plastics suitable for used in the present application may be any common waste plastic materials, such as waste plastics in fresh domestic garbage, waste plastics from industrial and agricultural production, and waste plastics in aged garbage, preferably waste plastics of poor quality that cannot be physically recycled. The waste plastic may be in the form of waste plastics rods, waste plastics pellets, waste plastics flakes, or combinations thereof, obtained by an initial processing of the above waste plastics. The waste plastic may comprise any one or more of PE, PP, PS and PVC plastics.

In some preferred embodiments, the method for pretreating waste plastics of the present application comprises the steps of:
  1) in a waste plastic pretreatment unit, contacting a waste plastic with a pretreating agent and a solvent oil for impurity removal; and
  2) separating the effluent of step 1) in a solid-liquid separation unit to obtain an insoluble material and an impurity-removed plastic-containing solution, wherein the impurity-removed plastic-containing solution has a metal content of less than 5 µg/g, a chlorine content of less than 20 µg/g and a silicon content of less than 3 µg/g.

In some further preferred embodiments, the method for pretreating waste plastics further comprises the steps of:
  3) in an extraction unit, contacting the insoluble material obtained in step 2) with a second organic solvent for solvent extraction, and subjecting the resulting product to solid-liquid separation to obtain a solid material and a liquid material;

4) treating the solid material obtained in step 3) in a pretreating agent recovering unit to recover the pretreating agent, and recycling at least a part of the recovered pretreating agent as a circulating pretreating agent to the waste plastic pretreating unit of step 1); and
5) subjecting the liquid material obtained in step 3) to a precipitation treatment and separation in a second solvent recovery unit to obtain solid plastic particles and recovered second organic solvent.

In some other preferred embodiments, the method for pretreating waste plastics of the present application comprises the steps of:
a) fully dissolving a waste plastic in a first organic solvent in a waste plastic dissolution-dechlorination unit;
b) subjecting the dissolution effluent obtained in step a) to solid-liquid separation in a dechlorination-separation unit, to obtain a chlorine-containing solution and a chlorine-removed waste plastic;
c) contacting the chlorine-removed waste plastic obtained in step b) and optionally an additional waste plastic with a pretreating agent and a solvent oil in a waste plastic pretreatment unit for impurity removal; and
d) separating the effluent of step c) in a solid-liquid separation unit to obtain an insoluble material and an impurity-removed plastic-containing solution having a metal content of less than 5 µg/g, a chlorine content of less than 20 µg/g and a silicon content of less than 3 µg/g.

In a further preferred embodiment, in step a), the waste plastic is fully dissolved in a first organic solvent at a temperature of 50 to 100° C. in a waste plastic dissolution-dechlorination unit, wherein the residence time of the waste plastic is 30 to 60 min; and the dissolution effluent is subjected to solid-liquid separation in a dechlorination-separation unit in step b), wherein the operating temperature of the dechlorination-separation unit is 50-100° C.

In a further preferred embodiment, the chlorine-containing solution obtained from the dechlorination-separation unit in step b) is subjected to a precipitation treatment and separation in a first solvent recovery unit to obtain plastic (such as PVC and/or PS) particles and recovered first organic solvent, and the operation and conditions of the precipitation treatment are as described above and will not be repeated here again.

In some further preferred embodiments, the method for pretreating waste plastics further comprises the steps of:
e) in an extraction unit, contacting the insoluble material obtained in step d) with a second organic solvent for solvent extraction, and subjecting the resulting product to solid-liquid separation to obtain a solid material and a liquid material;
f) treating the solid material obtained in step e) in a pretreating agent recovery unit to recover the pretreating agent, and recycling at least a part of the recovered pretreating agent as a circulating pretreating agent to the waste plastic pretreatment unit of step c); and
g) subjecting the liquid material obtained in step e) to a precipitation treatment and separation in a second solvent recovery unit to obtain solid plastic particles and recovered second organic solvent.

In the above further preferred embodiment, the operating conditions of the extraction unit in step 3) or step e) are matched with the second organic solvent used, and the purpose of the extraction is to remove solvent oil adhered to the solid material to be discharged, reduce the total amount of the solid material discharged, and finally achieve the purpose of emission reduction.

In the above further preferred embodiment, the precipitation treatment in step 5) or step g) is preferably selected from back-extraction, simple distillation, flash evaporation, rectification, or combinations thereof, and the operating temperature can be flexibly controlled according to the type and amount of the solvent used.

The method for pretreating waste plastics according to the present application can effectively remove metal impurities, chlorine impurities and silicon impurities from waste plastics, and the resulting impurity-removed plastic-containing solution can be used as a hydrocarbon feedstock and subjected to further processing, so as to produce chemical raw materials such as olefins and aromatics or produce products such as automotive fuel. In particular, the silicon impurities can be removed in the original form of the organosilicon polymer added during the processing of the plastics, thereby effectively avoiding the influence of the silicon impurities on the catalyst used in subsequent processing unit. Meanwhile, the influence of chlorine impurities on subsequent processing units can be effectively avoided by reducing the chlorine content in waste plastics.

In a second aspect, the present application provides a waste plastic pretreatment system for carrying out the method for pretreating waste plastics of the present application, comprising a waste plastic pretreatment unit and a solid-liquid separation unit, wherein the waste plastic pretreatment unit is provided with a waste plastic inlet, an optional chlorine-removed waste plastic inlet, a pretreating agent inlet, a solvent oil inlet, and a pretreatment effluent outlet, the solid-liquid separation unit is provided with an inlet, an insoluble material outlet, and an impurity-removed plastic-containing solution outlet, the pretreatment effluent outlet of the waste plastic pretreatment unit is in communication with the inlet of the solid-liquid separation unit.

In the waste plastic pretreatment system of the present application, in the waste plastic pretreatment unit, most of the plastic is dissolved in the solvent oil and subjected to desiliconization and demetallization in the presence of the pretreating agent, and PVC in the waste plastic is adequately decomposed to HCl and captured by the pretreating agent, thereby providing a dechlorination effect. The effluent obtained after impurity removal is passed to a solid-liquid separation unit, and separated into an insoluble material and an impurity-removed plastic-containing solution.

In the waste plastic pretreatment system of the present application, the waste plastic pretreatment unit can effectively remove metal impurities, chlorine impurities and silicon impurities in the waste plastic, and the resulting impurity-removed plastic-containing solution preferably has a metal content of less than 5 µg/g, a chlorine content of less than 20 µg/g and a silicon content of less than 3 µg/g; further preferably has a metal content of less than 5 µg/g, a chlorine content of less than 3 µg/g and a silicon content of less than 3 µg/g; particularly preferably has a metal content of less than 3 µg/g, a chlorine content of less than 1 µg/g and a silicon content of less than 1 µg/g. In particular, the silicon impurities are removed in the original form of the organosilicon polymer added during the processing of the plastics, thereby effectively avoiding the influence of the silicon impurities on the catalyst used in subsequent processing unit. Meanwhile, the influence of chlorine impurities on subsequent processing units is effectively avoided by reducing the chlorine content in the waste plastic.

In a preferred embodiment, the waste plastic pretreatment unit can be one stage of kettle-type dissolver or a plurality of stages of kettle-type dissolvers connected in series or in parallel, or a profiled dissolver having a dissolving action, or a device having the same function, such as a continuous screw extractor. Further preferably, a stirring device and a heating device are provided in the waste plastic pretreatment unit, the stirring device can be electrically driven or magnetically driven and can be one or more of paddle type, anchor type, frame type and spiral type, and the stirring speed of the stirring device can be 1-300 r/min, preferably 60-100 r/min; the heating device may be one or more of internal heating and/or external heating devices. For example, the external heating device can be one or more of jacket-type or semicircular coil pipe heating devices, and the internal heating device can be various built-in coil pipes; and the heat source can be one or more of electricity, heat conduction oil, steam and open flame.

The waste plastic pretreatment system of the present application has no particular requirement on the form of the solid-liquid separation unit, which may be various forms of filters, centrifuges, or combinations thereof. In a preferred embodiment, the solid-liquid separation unit can be one stage or a plurality of stages connected in series of continuous automatic solid-liquid separation equipment with heat preservation function, oil resistance and organic solvent resistance in various forms, or one or more of various types of filters with automatic replacement of filter screens, filter presses with scraper plates, cross-flow filters, horizontal screw centrifuges and screw squeezing desolventizer. Further preferably, the solid-liquid separation unit may be provided with a heating device and a heat-preserving device, the heating device may be one or more of external heating or internal heating devices, the external heating device may be one or more of jacket-type or semicircular coil pipe heating devices, and the internal heating device may be various built-in coil pipes; and the heat source can be one or more of electricity, heat conduction oil, steam and open flame. Preferably, the operating temperature of the solid-liquid separation unit may be, for example, 250-410° C. Where the solid-liquid separation unit is a filter, the mesh diameter of the filter can be 0.1-1 mm, preferably 0.1-10 µm.

In a preferred embodiment, the waste plastic pretreatment system further comprises a waste plastic dissolution-dechlorination unit provided with a waste plastic inlet, a first organic solvent inlet, and a dissolution effluent outlet, and a dechlorination-separation unit provided with an inlet, a chlorine-containing solution outlet, and a chlorine-removed waste plastic outlet, the dissolution effluent outlet of the waste plastic dissolution-dechlorination unit is in communication with the inlet of the dechlorination-separation unit, and the chlorine-removed waste plastic outlet of the dechlorination-separation unit is in communication with the chlorine-removed waste plastic inlet of the waste plastic pretreatment unit.

In this preferred embodiment, the waste plastic can be subjected to adequate dissolution treatment in the first organic solvent at a temperature of, for example, 50 to 100° C. in the waste plastic dissolution-dechlorination unit, and the residence time of the waste plastic can be, for example, 30 to 60 min. The processed material is subjected to solid-liquid separation in the dechlorination-separation unit, which may be operated at, for example, 50 to 100° C., to obtain a chlorine-containing solution and a chlorine-removed waste plastic.

In this preferred embodiment, the waste plastic is passed through the waste plastic dissolution-dechlorination unit, where most of the chlorine-containing waste plastic in the waste plastic is removed, and the chlorine-removed waste plastic obtained after the separation in the dechlorination-separation unit may have a chlorine content of less than 20 µg/g.

In a further preferred embodiment, the waste plastic dissolution-dechlorination unit may be one stage of kettle-type dissolver or a plurality of stages of kettle-type dissolvers connected in series or in parallel, or a profiled dissolver having a dissolving action, or a device having the same function, such as a continuous screw extractor. Further preferably, a stirring device and a heating device are provided in the waste plastic dissolution-dechlorination unit, the stirring device can be electrically driven or magnetically driven and can be one or more of paddle type, anchor type, frame type and spiral type, and the stirring speed of the stirring device can be 1-300 r/min, preferably 60-100 r/min; the heating device may be one or more of internal heating and/or external heating devices. For example, the external heating device can be one or more of jacket-type or semicircular coil pipe heating devices, and the internal heating device can be various built-in coil pipes; and the heat source can be one or more of electricity, heat conduction oil, steam and open flame.

In a further preferred embodiment, the dechlorination-separation unit can be one stage or a plurality of stages connected in series of continuous automatic solid-liquid separation equipment with heat preservation function, oil resistance and organic solvent resistance in various forms, or one or more of various types of filters with automatic replacement of filter screens, filter presses with scraper plates, cross-flow filters, horizontal screw centrifuges and screw squeezing desolventizer. Further preferably, the dechlorination-separation unit may be provided with a heating device and a heat-preserving device, the heating device may be one or more of external heating or internal heating devices, the external heating device may be one or more of jacket-type or semicircular coil pipe heating devices, and the internal heating device may be various built-in coil pipes; and the heat source can be one or more of electricity, heat conduction oil, steam and open flame. Where the dechlorination-separation unit is a filter, the mesh diameter of the filter can be 0.1-10 mm, further preferably 0.1-1 mm.

In a further preferred embodiment, the waste plastic pretreatment system further comprises a first solvent recovery unit provided with a chlorine-containing solution inlet, a plastic particle outlet, and a recovered first organic solvent outlet, wherein the chlorine-containing solution outlet of the waste plastic dissolution-dechlorination unit is in communication with the chlorine-containing solution inlet of the first solvent recovery unit.

In this further preferred embodiment, the chlorine-containing solution obtained from the dechlorination-separation unit is subjected to a precipitation treatment and separation in the first solvent recovery unit to obtain plastic (such as PVC and/or PS) particles and recovered first organic solvent. Preferably, the precipitation treatment is selected from back-extraction, simple distillation, flash distillation, rectification, or combinations thereof, and correspondingly the precipitation treatment equipment used may be selected from back-extraction kettle, back-extraction column, fractionation column, flash column, rectification column, or combinations thereof. Further preferably, the precipitation treatment is a back-extraction coupled distillation, in which the back-extractant is water. For example, in some embodiments, after the chlorine-containing solution is passed to the first solvent recovery unit and contacted with the back-extractant water, dissolved plastic (e.g., PVC and/or PS) will precipitate as solid particles, and the remaining liquid portion will be the first organic solvent comprising water; and after distilling the first organic solvent comprising water to obtain water and recovered first organic solvent, the recovered first organic solvent can be reused.

In some further preferred embodiments, the back-extracted effluent is separated by filtration to obtain plastic (PVC and/or PS) particles and wastewater comprising organic solvent, and the filtration device used is selected from one stage or a plurality of stages connected in series or in parallel of filter presses, plate and frame filters, centrifuges, screw squeezing desolventizers, or combinations thereof.

In a preferred embodiment, the waste plastic pretreatment system further comprises an extraction unit, a pretreating agent recovery unit, and a second solvent recovery unit;

the extraction unit is provided with an insoluble material inlet, a second organic solvent inlet, a solid material outlet and a liquid material outlet, and the insoluble material outlet of the solid-liquid separation unit is in communication with the insoluble material inlet of the extraction unit;

the pretreating agent recovery unit is provided with a solid material inlet and a circulating pretreating agent outlet, the solid material outlet of the extraction unit is in communication with the solid material inlet of the pretreating agent recovery unit, and the circulating pretreating agent outlet of the pretreating agent recovery unit is in communication with the pretreating agent inlet of the waste plastic pretreatment unit;

the second solvent recovery unit is provided with a liquid material inlet, a solid plastic particle outlet and a recovered second organic solvent outlet, and the liquid material outlet of the extraction unit is in communication with the liquid material inlet of the second solvent recovery unit.

In this preferred embodiment, one or more of solvent extraction towers and static mixing extractors may be provided in the extraction unit, the operating conditions of the extraction unit are matched with the second organic solvent used, and the purpose of the extraction is to remove solvent oil adhered to the solid material to be discharged, reduce the total amount of the solid material discharged, and finally achieve the purpose of emission reduction.

In this preferred embodiment, the solid material obtained from the extraction unit is treated in a pretreating agent recovery unit, and then a part or all of it is returned to the waste plastic pretreatment unit as a circulating pretreating agent. The treatment performed in the pretreating agent recovery unit may be selected from screening, regenerating, or combinations thereof. The pretreating agent recovery unit can be in the form of a vibrating screen, a rotary screen, a single-section or multi-section fluidized bed regenerator, a rotary-kiln regenerator, an infrared heating furnace or the like.

In this preferred embodiment, the liquid material obtained from the extraction unit is subjected to a precipitation treatment and separation in the second solvent recovery unit to obtain solid plastic particles and recovered second organic solvent, the precipitation treatment may be selected from back-extraction, simple distillation, flash evaporation, rectification, or combinations thereof, and the operating temperature can be flexibly controlled according to the type and amount of the solvent used. The types of equipment that can be used in the second solvent recovery unit are the same as described above for the first solvent recovery unit and will not be described in detail here.

FIG. 1 is a schematic view of a preferred embodiment of the method and system for pretreating waste plastics according to the present application. As shown in FIG. 1, dried and crushed waste plastic 25 is charged into a waste plastic dissolution-dechlorination unit 1, fully dissolved in a first organic solvent 8, and the dissolution effluent is subjected to solid-liquid separation in a dechlorination-separation unit to obtain a chlorine-containing solution 10 and a chlorine-removed waste plastic 9. The resulting chlorine-containing solution 10 is passed to a first solvent recovery unit 2, and after precipitation treatment and separation, plastic (such as PVC and/or PS) particles 12 and recovered first organic solvent 11 are obtained, and the recovered first organic solvent 11 is recycled.

The dried and crushed waste plastic 13 and the optional chlorine-removed waste plastic 9 are passed to a waste plastic pretreatment unit 3, contacted with a solvent oil 14 and a pretreating agent 15 to carry out impurity removal treatment, and the treated effluent 16 is passed through a solid-liquid separation unit 4 and separated into an insoluble material 17 and an impurity-removed plastic-containing solution 24.

The resulting insoluble material 17 is passed to an extraction unit 5, contacted with a second organic solvent 18 for solvent extraction, and the resulting product is subjected to solid-liquid separation to obtain a solid material 21 and a liquid material 19. After the resulting solid material 21 is treated in a pretreating agent recovery unit 7, at least part of the solid material is returned to the waste plastic pretreatment unit 3 as a circulating pretreating agent 22, and the rest of the solid material 23 is discharged out of the device. The resulting liquid material 19 is subjected to a precipitation treatment and separation in the second solvent recovery unit 6 to obtain solid plastic particles 26 and recovered second organic solvent 20, and the recovered second organic solvent 20 is recycled.

In a third aspect, the present application provides a method for producing an automotive fuel from waste plastics, comprising the steps of:
I) pretreating a waste plastic with the method for pretreating waste plastics or the waste plastic pretreatment system according to the present application to obtain an impurity-removed plastic-containing solution;
II) contacting the impurity-removed plastic-containing solution and an optional catalytic cracking feedstock with a catalytic cracking catalyst for reaction; and
III) separating the reaction product of step II) to obtain a gasoline fraction and/or a diesel fraction.

According to the present application, the optional catalytic cracking feedstock can be any conventional catalytic cracking feedstock, such as VGO, atmospheric residue (AR), deasphalted oil (DAO), and the like.

According to the present application, the catalytic cracking catalyst used in step II) may be any conventional catalytic cracking catalyst. In a preferred embodiment, the catalytic cracking catalyst comprises a zeolite, an inorganic oxide binder, and optionally a clay; preferably, the zeolite is present in an amount of 5 to 50 wt %, the inorganic oxide is present in an amount of 5 to 90 wt %, and the clay is present in an amount of 0 to 70 wt %, based on the total weight of the catalyst. Further preferably, the zeolite is selected from the group consisting of rare earth-containing or rare earth-free Y or HY zeolites, rare earth-containing or rare earth-free ultrastable Y zeolites, zeolites having MFI structure, or combinations thereof.

In a preferred embodiment, the catalytic cracking conditions used in step II) include: a reaction temperature of 460-530° C., a reaction pressure of 0.1-0.4M Pa, a catalyst-to-oil ratio of 3-10, and a reaction time of 2-4 s. In the case that the catalytic cracking reaction is carried out in a riser reactor, the catalyst-to-oil ratio refers to the weight ratio of the catalyst circulation amount to the total feed amount, and the reaction time refers to the average residence time of the reaction stream in the riser reactor before entering the inlet of the cyclone.

In a preferred embodiment, the catalytic cracking product obtained in step II) is separated in step III) to obtain at least a gas, a gasoline fraction and a diesel fraction. Both the resulting gasoline fraction and diesel fraction are high-quality automotive fuel components, and may be subjected to further treatment. For example, the gasoline fraction may be treated using the S-Zorb technology of Sinopec, the RSDS technology of Sinopec Research Institute of Petroleum Processing Co., Ltd. and the like, to produce clean gasoline meeting National V standard or National VI standard of China. The diesel fraction may be treated together with a straight-run diesel fraction using RTS technology or diesel hydrogenation ultra-deep desulfurization technology of Sinopec Research Institute of Petroleum Processing Co., Ltd. and the like, to produce clean diesel meeting National V standard or National VI standard of China.

In some preferred embodiments, the method for producing automotive fuel from waste plastics of the present application comprises the steps of:
  A) mixing a waste plastic with a first organic solvent (also referred to herein as a solvent I) and fully dissolving at a temperature of 25 to 120° C., in a waste plastic dissolution-dechlorination unit (also referred to herein as a first waste plastic impurity removal unit);
  B) subjecting the dissolution effluent of step A) to solid-liquid separation in a dechlorination-separation unit (also referred to herein as solid-liquid separation device I or separation unit I) to obtain a chlorine-containing solution (also referred to herein as first solution) and a chlorine-removed waste plastic (also referred to herein as first solid mixture);
  C) contacting the chlorine-removed waste plastic obtained in step B) and optionally an additional waste plastic with a pretreating agent (also referred to herein as an impurity removal additive) and a solvent oil (also referred to herein as a solvent II), and carrying out an impurity removal treatment at a temperature of 200-450° C., in a waste plastic pretreatment unit (also referred to herein as a second waste plastic impurity removal unit);
  D) separating the effluent of step C) in a solid-liquid separation unit (also referred to herein as separation unit II) to obtain an insoluble material (also referred to herein as second solid mixture) and an impurity-removed plastic-containing solution (also referred to herein as second solution) having a chlorine content of less than 3 µg/g and a silicon content of less than 3 µg/g;
  E) contacting the impurity-removed plastic-containing solution obtained in step D) and an optional catalytic cracking feedstock with a catalytic cracking catalyst in a catalytic cracking unit for reaction; and
  F) separating the reaction product of step E) to obtain a gas, a gasoline fraction and a diesel fraction.

In a fourth aspect, there is provided a system for carrying out the method for producing an automotive fuel from waste plastics of the present application, comprising the waste plastic pretreatment system according to the present application and a catalytic cracking unit; wherein the catalytic cracking unit is provided with an impurity-removed plastic-containing solution inlet, an optional catalytic cracking feedstock inlet and at least one outlet, and the impurity-removed plastic-containing solution outlet of the solid-liquid separation unit of the waste plastic pretreatment system is in communication with the impurity-removed plastic-containing solution inlet of the catalytic cracking unit.

In the system for producing automotive fuel from waste plastics of the present application, the catalytic cracking unit may be any of various reaction units suitable for conducting a catalytic cracking reaction, and for example, may be selected from fixed bed catalytic cracking unit, moving bed catalytic cracking unit, fluidized bed catalytic cracking unit, riser reactor catalytic cracking unit, or combinations thereof. Particularly, the catalytic cracking unit can be selected from TSRFCC, MIP, MIP-CGP, FDF-CC, MGG, MIO, ARGG catalytic cracking units, or the combination thereof, and can be flexibly chosen according to the existing equipment of a refinery.

In some preferred embodiments, the system for producing automotive fuel from waste plastics comprises a waste plastic dissolution-dechlorination unit, a dechlorination-separation unit, a waste plastic pretreatment unit, a solid-liquid separation unit, and a catalytic cracking unit;
  the waste plastic dissolution-dechlorination unit is provided with a waste plastic inlet, a first organic solvent inlet, a stirring device, a heating device and a dissolution effluent outlet;
  the dechlorination-separation unit is provided with an inlet, a chlorine-containing solution outlet and a chlorine-removed waste plastic outlet;
  the waste plastic pretreatment unit is provided with a waste plastic inlet, a chlorine-removed waste plastic inlet, a pretreating agent inlet, a solvent oil inlet, a stirring device, a heating device and a pretreatment effluent outlet;
  the solid-liquid separation unit is provided with an inlet, an insoluble material outlet and an impurity-removed plastic-containing solution outlet;
  the catalytic cracking unit is provided with an impurity-removed plastic-containing solution inlet, an optional catalytic cracking feedstock inlet, a gas outlet, a gasoline fraction outlet and a diesel fraction outlet;
  the dissolution effluent outlet of the waste plastic dissolution-dechlorination unit is in communication with the inlet of the dechlorination-separation unit, the chlorine-removed waste plastic outlet of the dechlorination-separation unit is in communication with the chlorine-removed waste plastic inlet of the waste plastic pretreatment unit, the pretreatment effluent outlet of the waste plastic pretreatment unit is in communication with the inlet of the solid-liquid separation unit, and the impurity-removed plastic-containing solution outlet of the solid-liquid separation unit is in communication with the impurity-removed plastic-containing solution inlet of the catalytic cracking unit.

In a further preferred embodiment, the system for producing automotive fuel from waste plastics further comprises a first solvent recovery unit provided with a chlorine-containing solution inlet, a plastic particle outlet (also referred to herein as chlorine-containing plastic particle outlet), and a recovered first organic solvent outlet, the chlorine-containing solution outlet of the dechlorination-separation unit is in communication with the chlorine-containing solution inlet of the first solvent recovery unit, and optionally, the recovered first organic solvent outlet of the first solvent recovery unit is in communication with the first organic solvent inlet of the waste plastic dissolution-dechlorination unit.

Figure 2:
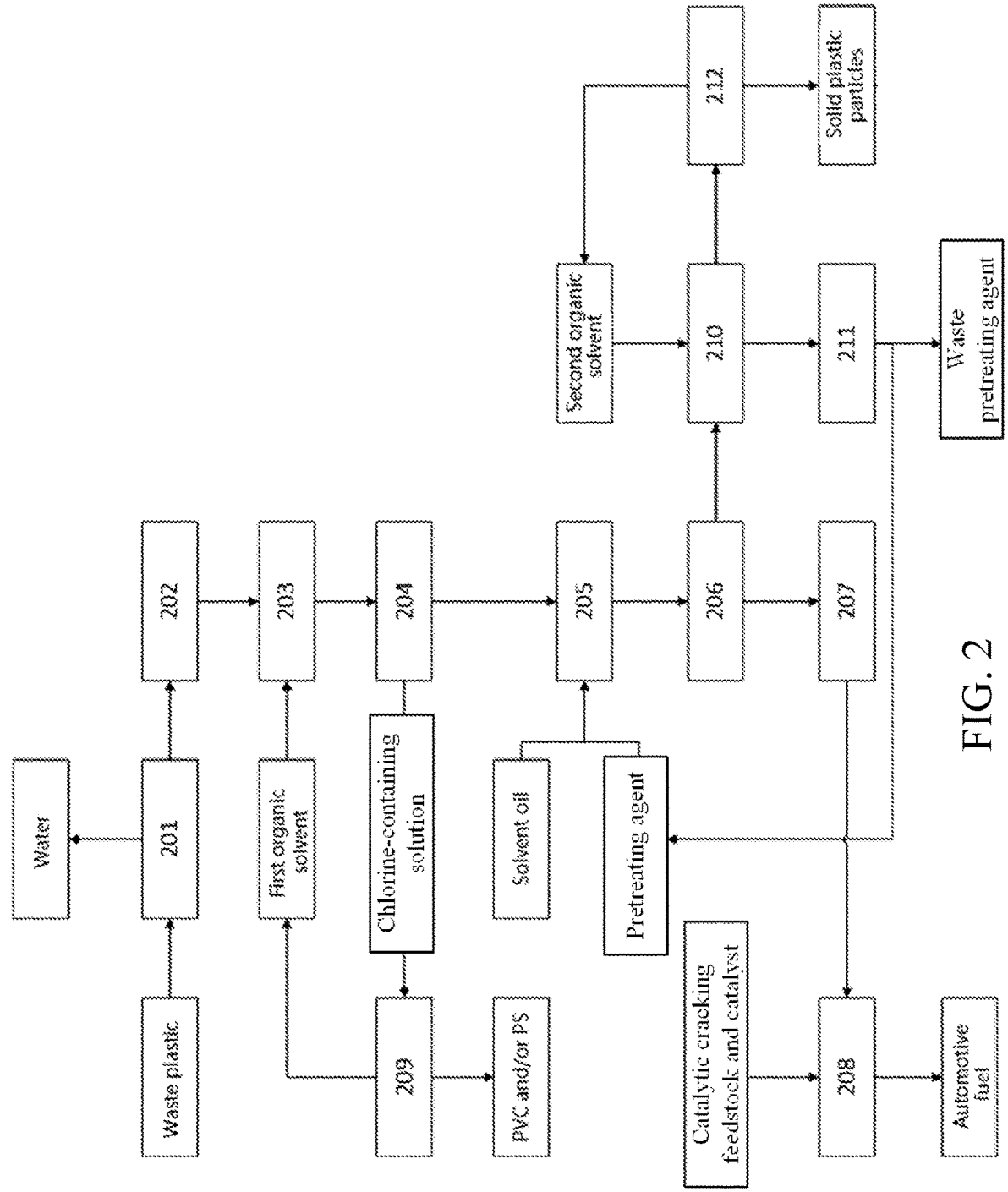
FIG. 2 shows a schematic diagram of a preferred embodiment of the method and system for producing automotive fuel from waste plastics according to the present application.

FIG. 2 shows a schematic diagram of a preferred embodiment of the method and system for producing automotive fuel from waste plastics according to the present application. As shown in FIG. 2, a waste plastic is sequentially processed in a drying unit 201 and a crushing unit 202, dried and crushed waste plastic particles and a first organic solvent are charged into a waste plastic dissolution-dechlorination unit 203, fully mixed and dissolved, and the dissolution effluent is separated into a chlorine-containing solution and a chlorine-removed waste plastic in a dechlorination-separation unit 204. The resulting chlorine-containing solution is treated in a first solvent recovery unit 209 to obtain the first organic solvent and plastic particles (e.g. PVC and/or PS). The resulting chlorine-removed waste plastic is passed to a waste plastic pretreatment unit 205, and subjected to an impurity removal treatment in the presence of a solvent oil and a pretreating agent, and the treated material is separated into an impurity-removed plastic-containing solution and an insoluble material through a solid-liquid separation unit 206. The resulting impurity-removed plastic-containing solution is passed to a catalytic cracking unit 208 through a fluid conveying unit 207, contacted with a catalytic cracking catalyst, optionally together with a catalytic cracking feedstock, to conduct a catalytic cracking reaction, and the reaction product is separated to obtain a gas, a gasoline fraction, a diesel fraction, a heavy cycle oil fraction and a slurry oil, wherein the gasoline fraction and the diesel fraction are used as automotive fuel. The resulting insoluble material and a second organic solvent are mixed and passed to an extraction unit 210, and are separated into a solid material and a liquid material. The resulting solid material is passed to a pretreating agent recovery unit 211, a part of recovered pretreating agent is recycled, the rest of the recovered pretreating agent is discharged as a waste pretreating agent, and the resulting liquid material is passed to a second solvent recovery unit 212 and treated therein to obtain recovered second organic solvent and solid plastic particles.

In some particularly preferred embodiments, the present application provides the following technical solutions:

A1, a method for pretreating waste plastics, comprising the steps of:
(1) optionally passing a waste plastic to a waste plastic dissolution-dechlorination unit, fully dissolving it in a first organic solvent, and subjecting the dissolution effluent to solid-liquid separation, to obtain a chlorine-containing solution and a chlorine-removed waste plastic, wherein the first organic solvent is selected from tetrahydrofuran, ketone solvents, chlorinated aliphatic hydrocarbons or combinations thereof;
(2) passing a waste plastic, optionally along with the chlorine-removed waste plastic obtained in step (1), to a waste plastic pretreatment unit, contacting it with a pretreating agent and a solvent oil for impurity removal, and passing the effluent passed through a solid-liquid separation unit to obtain an insoluble material and an impurity-removed plastic-containing solution having a metal content of less than 5 µg/g, a chlorine content of less than 20 µg/g and a silicon content of less than 3 µg/g; wherein the pretreating agent is one or more selected from humus soil, red mud, waste catalyst from oil-refining unit, kaolin, semicoke, activated carbon and gasification ash and slag, and optional alkaline oxide.

A2, the method according to Item A1, wherein the waste plastic is selected from waste plastics in fresh domestic garbage, waste plastics from industrial and agricultural production, waste plastics in aged garbage, or combinations thereof, and the kind of the waste plastic is any one or more of PE, PP, PS, and PVC.

A3, the method according to Item A1, wherein the waste plastic is washed, dried and crushed before passing to the optional waste plastic dissolution-dechlorination unit, the waste plastic pretreatment unit, and the crushed waste plastic has a particle size of 1 to 200 mm, preferably 1 to 50 mm.

A4, the method according to Item A1, wherein the first organic solvent is a mixed solvent of tetrahydrofuran and a ketone solvent at any weight ratio, and the ketone solvent is selected from methyl ethyl ketone, methyl isobutyl ketone, cyclohexanone, isophorone, or combinations thereof;
the weight ratio of the first organic solvent to the waste plastic is 1:10 to 10:1.

A5, the method according to Item A1 or A4, wherein the ketone solvent is one or more selected from methyl ethyl ketone and cyclohexanone; preferably methyl ethyl ketone;
the first organic solvent is a mixed solvent composed of tetrahydrofuran and a ketone solvent in a weight ratio of 1:3 to 3:1;
preferably, the first organic solvent is a mixed solvent composed of tetrahydrofuran and a ketone solvent in a weight ratio of 1:2 to 2:1.

A6, the method according to Item A1, wherein in step (1), the waste plastic is fully dissolved in the first organic solvent at a temperature of 50 to 100° C. with a residence time of the waste plastic of 30 to 60 min, in the waste plastic dissolution-dechlorination unit.

A7, the method according to Item A1, wherein a first solvent recovery unit is provided, the chlorine-containing solution obtained in step (1) is passed into the first solvent recovery unit, and subjected to a precipitation treatment and separation, to obtain PVC and/or PS particles and recovered first organic solvent;
the precipitation treatment is selected from back-extraction, simple distillation, flash evaporation, rectification, or combinations thereof.

A8, the method according to Item A7, wherein in the first solvent recovery unit, the precipitation treatment is a back-extraction coupled distillation, in which the back-extractant is water, the back-extraction temperature is 70-100° C., and the distillation temperature is 80-100° C.

A9, the method according to Item A1, wherein the treatment conditions of the waste plastic pretreatment unit include: a temperature of 250-410° C., a pressure of 0.1-5 MPa, and a residence time of the waste plastic of 10-60 min.

A10, the method according to Item A9, wherein the treatment conditions of the waste plastic pretreatment unit include: a temperature of 320-390° C., a pressure of 0.5-4.0 MPa, and a residence time of the waste plastic of 15-45 min.

A11, the method according to Item A1, wherein the distillation range of the solvent oil is 80-550° C., the solvent oil has a total aromatics content of greater than 50 mass % and a monocyclic aromatics content of greater than 20 mass %; the weight ratio of the solvent oil to the waste plastic is 1:10 to 10:1.

A12, the method according to Item A11, wherein the content of monocyclic aromatics in the solvent oil is greater than 40 mass %;
the weight ratio of the solvent oil to the waste plastic is 1:1 to 7:1.

A13, the method according to Item A1, wherein the particle size of the pretreating agent is in a range of 75 to 150

μm; the weight ratio of the pretreating agent to the waste plastic is 1:10 to 2:1, preferably 1:7 to 1:5.

A14, the method according to Item A1 or A13, wherein the pretreating agent is one or more of waste catalytic cracking catalyst, humus soil, activated carbon, and optionally alkaline oxide.

A15, the method according to Item A1, characterized in that the operating temperature of the solid-liquid separation unit is 250-410° C.;
  the impurity-removed plastic-containing solution has a metal content of less than 3 μg/g, a chlorine content of less than 1 μg/g, and a silicon content of less than 1 μg/g.

A16, the method according to Item A1, further comprising the step of:
  (3) passing the insoluble material obtained in step (2) to an extraction unit, contacting it with a second organic solvent for solvent extraction, and subjecting the resulting product to solid-liquid separation to obtain a solid material and a liquid material,
  treating the resulting solid material in a pretreating agent recovery unit, and recycling at least part of the solid material to the waste plastic pretreatment unit in step (2) as a circulating pretreating agent;
  subjecting the resulting liquid material to a precipitation treatment and separation in a second solvent recovery unit to obtain solid plastic particles and recovered second organic solvent;
  where the second organic solvent is selected from benzene, toluene, trichloromethane, cyclohexanone, ethyl acetate, butyl acetate, carbon disulfide, tetrahydrofuran, gasoline, or combinations thereof.

A17, the method according to Item A16, wherein the treatment in the pretreating agent recovering unit comprises one or more of screening and regenerating.

A18, the method according to Item A16, wherein, in the second solvent recovery unit, the precipitation treatment is selected from back-extraction, simple distillation, flash evaporation, rectification, or combinations thereof.

A19, a system useful in the method according to any one of Items A1 to A18, comprising an optional waste plastic dissolution-dechlorination unit, a waste plastic pretreatment unit, and a solid-liquid separation unit;
  the waste plastic dissolution-dechlorination unit is provided with a waste plastic inlet, a first organic solvent inlet, a chlorine-containing solution outlet and a chlorine-removed waste plastic outlet;
  the waste plastic pretreatment unit is provided with a waste plastic inlet, an optional chlorine-removed waste plastic inlet, a pretreating agent inlet, a solvent oil inlet and a pretreatment effluent outlet, the pretreatment effluent outlet is in communication with the inlet of the solid-liquid separation unit, and the solid-liquid separation unit is provided with an insoluble material outlet and an impurity-removed plastic-containing solution outlet.

A20, the system according to Item A19, further comprising a first solvent recovery unit provided with a chlorine-containing solution inlet, a PVC and/or PS particles outlet, a recovered first organic solvent outlet; the chlorine-containing solution outlet of the waste plastic dissolution-dechlorination unit is in communication with the chlorine-containing solution inlet of the first solvent recovery unit.

A21, the system according to Item A19, further comprising an extraction unit, a pretreating agent recovery unit, and a second solvent recovery unit;
  the extraction unit is provided with an insoluble material inlet, a second organic solvent inlet, a solid material outlet and a liquid material outlet, and the insoluble material outlet of the solid-liquid separation unit is in communication with the insoluble material inlet of the extraction unit;
  the pretreating agent recovery unit is provided with a solid material inlet and a circulating pretreating agent outlet, the solid material outlet of the extraction unit is in communication with the solid material inlet of the pretreating agent recovery unit, and the circulating pretreating agent outlet of the pretreating agent recovery unit is in communication with the pretreating agent inlet of the waste plastic pretreatment unit;
  the second solvent recovery unit is provided with a liquid material inlet, a solid plastic particle outlet and a recovered second organic solvent outlet, and the liquid material outlet of the extraction unit is in communication with the liquid material inlet of the second solvent recovery unit.

B1, a method for producing an automotive fuel from waste plastics, comprising the steps of:
  (1) passing a waste plastic and a first organic solvent to a waste plastic dissolution-dechlorination unit, fully mixing and dissolving at a temperature of 25-120° C., and separating the dissolution effluent into a chlorine-containing solution and a chlorine-removed waste plastic in a dechlorination-separation unit, wherein the first organic solvent is selected from tetrahydrofuran, ketone solvents, chlorinated aliphatic hydrocarbons, or combinations thereof;
  (2) passing the chlorine-removed waste plastic to a waste plastic pretreatment unit, and subjecting it to a treatment at a temperature of 200-450° C. in the presence of a solvent oil and a pretreating agent for impurity removal, separating the treated material in a solid-liquid separation unit, to obtain an impurity-removed plastic-containing solution, having a chlorine content of less than 3 μg/g and a silicon content of less than 3 μg/g, and an insoluble material;
  (3) passing the impurity-removed plastic-containing solution, optionally along with a catalytic cracking feedstock, to a catalytic cracking unit, contacting it with a catalytic cracking catalyst for catalytic cracking reaction, and separating to at least obtain a gas, a gasoline fraction and a diesel fraction.

B2, the method according to Item B1, wherein the first organic solvent is a mixed solvent of tetrahydrofuran and a ketone solvent at any weight ratio, the ketone solvent is selected from methyl ethyl ketone, methyl isobutyl ketone, cyclohexanone, isophorone, or combinations thereof;
  the weight ratio of the first organic solvent to the waste plastic is 1:10 to 10:1.

B3, the method according to Item B2, wherein the ketone solvent is one or more selected from methyl ethyl ketone, and cyclohexanone, preferably methyl ethyl ketone,
  the first organic solvent is a mixed solvent composed of tetrahydrofuran and a ketone solvent in a weight ratio of 1:3 to 3:1.

B4, the method according to any of Items B1 to B3, wherein the first organic solvent is a mixed solvent of tetrahydrofuran and a ketone solvent in a weight ratio of 1:2 to 2:1.

B5, the method according to Item B1, wherein in step (1), the waste plastic is fully mixed and dissolved in the first organic solvent at a temperature of 50-100° C. in the waste plastic dissolution-dechlorination unit; and the residence time of the waste plastic is preferably 30-60 min.

B6, the method according to Item B1, wherein the chlorine content of the chlorine-removed waste plastic is less than 20 μg/g.

B7, the method according to Item B1, wherein in step (2), the solvent oil is an aromatic-rich distillate oil with a distillation range of 80-540° C.; the solvent oil has a total aromatics content of greater than 50 mass % and a monocyclic aromatics content of greater than mass %;
preferably, the solvent oil has a monocyclic aromatics content of greater than 40 mass %.

B8, the method according to Item B1, wherein in step (2), the pretreating agent is one or more selected from the group consisting of humus soil, red mud, waste catalyst from oil-refining unit, kaolin, activated carbon, semicoke and gasification ash and slag; the particle size of the pretreating agent is in a range of 75-150 μm.

B9, the method according to Item B8, wherein in step (2), the pretreating agent is one or more selected from waste catalytic cracking catalyst from catalytic cracking unit, humus soil and activated carbon.

B10, the method according to Item B1, wherein in step (2), the weight ratio of the solvent oil to the waste plastic is 1:10 to 10:1;
the pretreating agent is used in an amount of 1-10 wt %, based on the total weight of the materials in the waste plastic pretreatment unit.

B11, the method according to Item B1, wherein in step (2), the conditions for the impurity removal treatment include: a temperature of 280-390° C., a pressure of 0.1-5 MPa, and a residence time of the chlorine-containing solution of 10-30 min.

B12, the method according to Item B1, wherein in step (3), the catalytic cracking catalyst comprises a zeolite, an inorganic oxide binder and optionally a clay;
based on the total weight of the catalyst, the zeolite is present in an amount of 5-50 wt %, the inorganic oxide is present in an amount of 5-90 wt %, and the clay is present in an amount of 0-70 wt %;
the zeolite is selected from the group consisting of rare earth-containing or rare earth-free Y or HY zeolites, rare earth-containing or rare earth-free ultrastable Y zeolites, zeolites having MFI structure, or combinations thereof.

B13, the method according to Item B1, wherein in step (3), the catalytic cracking conditions include: a reaction temperature of 460-530° C., a catalyst-to-oil ratio of 5-10, and a residence time of 2-4 s.

B14, the method according to Item B1, wherein the waste plastic is selected from waste plastics in fresh domestic garbage, waste plastics from industrial and agricultural production, waste plastics in aged garbage, or combinations thereof, and the kind of the waste plastic is any one or more of PE, PP, PS, and PVC.

B15, the method according to Item B1, wherein the waste plastic is washed, dried and crushed before passing to the waste plastic dissolution-dechlorination unit, and the crushed waste plastics has a particle size of 1 to 200 mm, preferably 1 to 50 mm.

B16, the method according to any of Items B1 to B15, wherein a solvent recovery unit is provided in step (1), and the chlorine-containing solution is passed to the solvent recovery unit and subjected to a treatment selected from back-extraction, simple distillation, flash evaporation, rectification, or combinations thereof, to obtain recovered first organic solvent and chlorine-containing plastic particles.

B17, the method according to Item B16, wherein the treatment in the solvent recovery unit in step (1) is a back-extraction coupled distillation, in which the back-extractant is water, the back-extraction temperature is 70-100° C., and the distillation temperature is 80-100° C.

B18, a system for producing an automotive fuel from waste plastics useful in the method according to any one of Items B1 to B15, comprising: a waste plastic dissolution-dechlorination unit, a waste plastic pretreatment unit and a catalytic cracking unit;
the waste plastic dissolution-dechlorination unit is provided with a waste plastic inlet, a first organic solvent inlet, a material outlet, a stirring device and a heating device, the material outlet of the waste plastic dissolution-dechlorination unit is in communication with the dechlorination-separation unit, and the dechlorination-separation unit is provided with a chlorine-containing solution outlet and a chlorine-removed waste plastic outlet;
the waste plastic pretreatment unit is provided with a chlorine-removed waste plastic inlet, a solvent oil inlet, a pretreating agent inlet, a material outlet, a stirring device and a heating device, wherein the chlorine-removed waste plastic outlet of the dechlorination-separation unit is in communication with the chlorine-removed waste plastic inlet of the waste plastic pretreatment unit; the material outlet of the waste plastic pretreatment unit is in communication with a solid-liquid separation unit, and the solid-liquid separation unit is provided with an impurity-removed plastic-containing solution outlet and an insoluble material outlet;
the catalytic cracking unit is provided with an impurity-removed plastic-containing solution inlet, an optional catalytic cracking feedstock inlet, a gas outlet, a gasoline fraction outlet and a diesel fraction outlet, and the solid-liquid separation unit is provided with an impurity-removed plastic-containing solution outlet in communication with the impurity-removed plastic-containing solution inlet of the catalytic cracking unit.

B19, the system for producing automotive fuel from waste plastics useful in the method according to Item B16, comprising: a waste plastic dissolution-dechlorination unit, a solvent recovery unit, a waste plastic pretreatment unit and a catalytic cracking unit;
the waste plastic dissolution-dechlorination unit is provided with a waste plastic inlet, a first organic solvent inlet, a material outlet, a stirring device and a heating device, the material outlet of the waste plastic dissolution-dechlorination unit is in communication with the dechlorination-separation unit, and the dechlorination-separation unit is provided with a chlorine-containing solution outlet and a chlorine-removed waste plastic outlet;
the solvent recovery unit is provided with a chlorine-containing solution inlet, a recovered first organic solvent outlet and a chlorine-containing plastic particle outlet, the chlorine-containing solution outlet of the dechlorination-separation unit is in communication with the chlorine-containing solution inlet of the solvent recovery unit, and the recovered first organic solvent outlet of the solvent recovery unit is in communication with the first organic solvent inlet of the waste plastic dissolution-dechlorination unit;
the waste plastic pretreatment unit is provided with a chlorine-removed waste plastic inlet, a solvent oil inlet, a pretreating agent inlet, a material outlet, a stirring device and a heating device, wherein the chlorine-removed waste plastic outlet of the dechlorination-separation unit is in communication with the chlorine-removed waste plastic inlet of the waste plastic pretreatment unit; the material outlet of the waste plastic pretreatment unit is in communication with a solid-liquid separation unit, and the solid-liquid separation unit is provided with an impurity-removed plastic-containing solution outlet and an insoluble material outlet;

the catalytic cracking unit is provided with an impurity-removed plastic-containing solution inlet, an optional catalytic cracking feedstock inlet, a gas outlet, a gasoline fraction outlet and a diesel fraction outlet, and the solid-liquid separation unit is provided with an impurity-removed plastic-containing solution outlet in communication with the impurity-removed plastic-containing solution inlet of the catalytic cracking unit.

EXAMPLES

The present application will be further illustrated with reference to the following examples, but the present application is not limited thereto.

In the following examples, the chlorine content in the solid material was measured by coulometric method in accordance with the standard method of RIPP 64-90 (see "Petrochemical Analysis Methods (RIPP Test Methods)", edited by Cuiding YANG et al., Science Press, published in 1990, pages 164-167, "Determination of total chlorine amount in crude oil by coulometric method"). The instrument used was Thermo Fisher ECS300 microcoulomb analyzer, and the sample was a frozen and crushed waste plastic powder sample.

In the following examples, the chlorine content of the liquid material was also measured by the RIPP 64-90 method, except that the sample was a liquid mixture.

In the following examples, the silicon content and metal content of the liquid material were determined according to GB17476-1998, "Standard test method for determination of additive elements, wear metals and contaminants in used lubricating oils and determination of selected elements in base oil by inductively coupled plasma atomic emission spectroscopy (ICP-AES)".

In the following examples, unless otherwise specified, crushing of waste plastics was carried out using a shear crusher with a mesh diameter of 50 mm.

The waste plastic raw materials used in the example series I and comparative example series I were as follows:

Waste plastic A1 is greenhouse film, mulching film, etc. from a place in Shandong province, which has been crushed after being cleaned and dried, the resulting waste plastic A1 contains 4.3% of ash, and 0.5% of water, comprises PE as a main plastic component, a small amount of EVA, and a trace amount of other inseparable materials such as PP, P S, etc., and has an average total chlorine content of about 850 ppm;

Waste plastic B1 is a waste plastic separated from the garbage of a paper mill in Jiangsu province, and is crushed after being cleaned and deeply dried, the resulting waste plastic B1 contains 9.5% of ash and 0% of water, comprises PE and PP as a main plastic component, and a small amount of PVC, PET, PS, etc., and has an average chlorine content of 2.2%;

Waste plastics C is a waste plastic in aged garbage excavated from a refuse landfill in Guangdong province, and is crushed after being cleaned and deeply dried, the resulting waste plastic C contains 7.3% of ash and 0% of water, is a mixed waste plastic comprising PE, PP, PS, PET and PVC, and has an average chlorine content of 1.9%; and Waste plastic D is a waste plastic excavated from a refuse landfill in Gan Zhou, Jiangxi province, and is crushed after being cleaned and deeply dried, the resulting waste plastic D contains 11.9% of ash, 0.5% of water, and 2.2% of chlorine, and its main component is a mixed waste plastic comprising PE, PP, PS, PET and PVC.

Example I-1

The crushed waste plastic A1 was sent to a waste plastic pretreatment unit through a screw feeder, the waste plastic pretreatment unit used was an external heating dissolving kettle, where the waste plastic was mixed with a pretreating agent and a solvent oil, and then subjected to a treatment for impurity removal at 350° C. and 1.5 MPa, the residence time of the waste plastic A1 was 30 min. The treated material was separated into an insoluble material and an impurity-removed plastic-containing solution in a solid-liquid separation unit, the plastic components in the resulting impurity-removed plastic-containing solution were mainly PE and PP (EVA was decomposed and incorporated into the solvent oil), and the solution had a concentration of the plastic components of 14.4%, a silicon content of less than 1 µg/g, a chlorine content of 6 µg/g, and a total metal content of 5.5 µg/g. The insoluble material was sent to an extraction unit, contacted with tetrahydrofuran for solvent extraction, the resulting product was separated to obtain a solid material and a liquid material, the resulting solid material was treated in a pretreating agent recovery unit, and a part of the solid material was recycled as a circulating pretreating agent to the waste plastic pretreatment unit. The liquid material was contacted with a back-extractant in a second solvent recovery unit for back-extraction, the resulting solid-liquid mixture was filtered to obtain solid plastic particles and a mixed solution, and the resulting mixed solution was rectified to respectively recover tetrahydrofuran and the back-extractant for recycling.

The solvent oil used was catalytic cracking light cycle oil that had a distillation range of 195-355° C., a total aromatics content of 73 mass %, and a monocyclic aromatics content of 52 mass %; and the weight ratio of the solvent oil to the waste plastic was 5:1.

The pretreating agent used was a waste FCC balanced catalyst provided by a refinery, of which the particle size was 75-150 µm, the $SiO_2$ content was 38.1%, and the contents of main metal components were as follows: $Al_2O_3$ 50.5%; $Fe_2O_3$ 1.31%; NiO 1.8%; $La_2O_3$ 3.3%; $CeO_2$ 1.4%; and the weight ratio of the pretreating agent to the waste plastic was 1:9.

The back-extractant was water, and was used in an amount 3 times of that of the liquid material, and the back-extraction temperature was normal temperature.

Example I-2

The crushed waste plastic B1 was sent to a waste plastic pretreatment unit through a screw feeder, the waste plastic pretreatment unit used was an external heating dissolving kettle, where the waste plastic was mixed with a pretreating agent and a solvent oil, and then subjected to an impurity removal treatment at 300° C. and 1.2 MPa, the residence time of the waste plastic B1 was 40 min. The treated material was separated into an insoluble material and an impurity-removed plastic-containing solution in a solid-liquid separation unit, the plastic components in the resulting impurity-removed plastic-containing solution were PE and PP, and the solution had a concentration of the plastic components of 14.2%, a silicon content of less than 1 μg/g, a chlorine content of 18 μg/g, and a total metal content of 7.9 μg/g. The insoluble material was sent to an extraction unit, contacted with tetrahydrofuran for solvent extraction, the resulting product was separated to obtain a solid material and a liquid material, the resulting solid material was treated in a pretreating agent recovery unit, and a part of the solid material was recycled as a circulating pretreating agent to the waste plastic pretreatment unit. The liquid material was contacted with a back-extractant water in a solvent recovery unit for back-extraction, the resulting solid-liquid mixture was filtered to obtain solid plastic particles and a mixed solution, and the resulting mixed solution was rectified to respectively recover tetrahydrofuran and the back-extractant for recycling.

The solvent oil used was catalytic cracking light cycle oil that had a distillation range of 195-355° C., a total aromatics content of 73 mass %, and a monocyclic aromatics content of 52 mass %; and the weight ratio of the solvent oil to the waste plastic was 5:1.

The pretreating agent used was a mixture of screened humus soil and CaO, wherein the humus soil was screened, organic matters present therein were removed, and a part thereof with a particle size of 75-150 μm was taken as the pretreating agent; blocky calcium oxide was crushed and screened, and a sample thereof with the same particle size was blended with the humus soil at a mass ratio of 8:2; and the weight ratio of the pretreating agent to the waste plastic was 1:7.

Example I-3

The crushed waste plastic B1 was sent to a waste plastic pretreatment unit through a screw feeder, the waste plastic pretreatment unit used was an external heating dissolving kettle, where the waste plastic was mixed with a pretreating agent and a solvent oil, and then subjected to an impurity removal treatment at 350° C. and 1.8 MPa, the residence time of waste plastics B1 was 45 min. The treated material was separated into an insoluble material and an impurity-removed plastic-containing solution in a solid-liquid separation unit, the plastic components in the resulting impurity-removed plastic-containing solution were PE and PP, and the solution had a concentration of the plastic components of 14.2%, a silicon content of less than 1 μg/g, a chlorine content of 10 μg/g, and a total metal content of 3.8 μg/g.

The solvent oil used was VGO from a refinery that had a distillation range of 275-581° C., a total aromatics content of 45.1 mass %, and a monocyclic aromatics content of 21 mass %; and the weight ratio of the solvent oil to the waste plastic was 5:1.

The pretreating agent used was a mixture of coal-based activated carbon and $Fe_2O_3$ at a mass ratio of 9:1, which had a particle size of 75-150 The weight ratio of the pretreating agent to the waste plastic was 1:8.

Example I-4

The crushed waste plastic B1 was sent to a waste plastic pretreatment unit through a screw feeder, the waste plastic pretreatment unit used was an external heating dissolving kettle, where the waste plastic was mixed with a pretreating agent and a solvent oil, and then subjected to a treatment for impurity removal at 350° C. and 1.8 MPa, the residence time of waste plastics B1 was 30 min. The treated material was separated into an insoluble material and an impurity-removed plastic-containing solution in a solid-liquid separation unit, the plastic components in the resulting impurity-removed plastic-containing solution were PE and PP, and the solution had a concentration of the plastic components of 14.2%, a silicon content of less than 1 μg/g, a chlorine content of 11 μg/g, and a total metal content of 4.1 μg/g.

The solvent oil used was catalytic cracking light cycle oil that had a distillation range of 156-338° C., a total aromatics content of 76.8 mass %, and a monocyclic aromatics content of 63.8 mass %; and the weight ratio of the solvent oil to the waste plastic was 5:1.

The pretreating agent used was a mixture of coal-based activated carbon and $Fe_2O_3$ at a mass ratio of 9:1, which had a particle size of 75-150 μm. The weight ratio of the pretreating agent to the waste plastic was 1:8.

Comparative Example I-1

This comparative example was performed using the same waste plastic raw material, solvent oil, and impurity-removal treatment conditions as describe in Example I-4, except that no pretreating agent was used. The treated material was separated into an insoluble material and an impurity-removed plastic-containing solution in a solid-liquid separation unit, the plastic components in the resulting impurity-removed plastic-containing solution were PE and PP, and the solution had a concentration of the plastic components of 14.2%, a silicon content of 42 μg/g, a chlorine content of 207 μg/g, and a total metal content of 13 μg/g.

The content of impurities in the impurity-removed plastic-containing solution obtained in this comparative example was too high to be directly used as the feed of a subsequent processing unit.

Examples I-5 to I-9

The crushed waste plastic C was preheated to 60° C., fed into a waste plastic dissolution-dechlorination device of a waste plastic dissolution-dechlorination unit, dissolved in a first organic solvent at 60° C., the residence time of the waste plastic C in the waste plastic dissolution-dechlorination device was 30 min, the dissolution effluent was separated into a chlorine-containing solution and a chlorine-removed waste plastic using a screw squeezing desolventizer, and the chlorine-removed waste plastic was further dried at a temperature slightly greater than the boiling point of the first organic solvent to recover the solvent.

The first organic solvent used in Example I-5 was tetrahydrofuran, and the weight ratio of the organic solvent to the waste plastic C was 10:1; the chlorine content in the chlorine-removed waste plastic was 23 μg/g.

The first organic solvent used in Example I-6 was methyl ethyl ketone, and the weight ratio of the organic solvent to the waste plastic C was 10:1; the chlorine content in the chlorine-removed waste plastic is 20 μg/g.

The first organic solvent used in Example I-7 was cyclohexanone, and the weight ratio of the organic solvent to the waste plastic C was 10:1; the chlorine content in the chlorine-removed waste plastic was 25 μg/g.

The first organic solvent used in Example I-8 was a mixture of tetrahydrofuran and methyl ethyl ketone at a weight ratio of 1:1, and the weight ratio of the organic solvent to the waste plastic C was 10:1; the chlorine content in the chlorine-removed waste plastic was 17 μg/g.

The first organic solvent used in Example I-9 was a mixture of tetrahydrofuran and methyl ethyl ketone at a weight ratio of 1:2, and the weight ratio of the organic solvent to the waste plastic C was 10:1; the chlorine content in the chlorine-removed waste plastic was 19 μg/g.

Example I-10

The experiment was carried out as described in Example I-5, except that: the first organic solvent was chlorobenzene, the dissolving temperature was 80° C., and the drying temperature of the chlorine-removed waste plastic was 140° C. The chlorine content in the chlorine-removed waste plastic was 32 μg/g.

Example I-11

The crushed waste plastic D was sent to a continuous waste plastic dissolution-dechlorination device of a waste plastic dissolution-dechlorination unit at a flow rate of 10 kg/h; a first organic solvent with THF/MEK=1:1 was preheated to 60° C. and fed at a flow rate of 100 kg/h to the continuous waste plastic dissolution-dechlorination device, and the rotational speed of the propeller in the waste plastic dissolution-dechlorination device was adjusted to obtain a residence time of 60 min. The mixed solution was sent to a screw squeezing desolventizer and separated into a chlorine-removed waste plastic and a chlorine-containing solution at 60° C.

The chlorine-containing solution was sent to a back-extraction device at 80° C. for back-extraction using hot water, the resultant was passed to a plate-and-frame filter press to separate out PVC and PS, and the solvent was passed to a fractionation system to fractionate and recover the first organic solvent and water for recycling.

The chlorine-removed waste plastic was sent to a kettle-type waste plastic pretreatment unit with a stirrer through a screw feeder, and 80 kg/h of catalytic cracking light cycle oil preheated to 350° C. used as a solvent oil was sent to the waste plastic pretreatment unit, along with 2 kg/h of FCC balanced catalyst used as a pretreating agent, and a treatment was performed for 35 minutes at 350° C. and 1.5 MPa, and then the resultant was passed to a screw squeezing desolventizer to obtain an oil-containing insoluble material and an impurity-removed plastic-containing solution. The plastic components in the resulting impurity-removed plastic-containing solution were mainly PE and PP, and the solution had a concentration of the plastic components of 9.7%, a silicon content of 2.3 μg/g, a chlorine content of 2.8 μg/g, and a total metal content of 1.8 μg/g.

The resulting oil-containing insoluble material was sent to an extraction unit, contacted with toluene for solvent extraction, the resulting product was separated to obtain a solid material and a liquid material, and the resulting solid material was treated in a pretreating agent recovery unit, and a part of it was recycled to the waste plastic pretreatment device as a circulating pretreating agent. The liquid material was rectified in a solvent recovery unit to respectively obtain solid plastic particles (PS), recovered toluene and a small amount of adhered solvent oil.

The waste plastic raw materials used in example series II and comparative example series II were as follows:

Waste plastic A2 was a mixture obtained by blending PE, PP, PS and PVC at a weight ratio of 10:5:1:1.5, of which the chlorine content was 0.88%, wherein the PE, PP and PVC were present as a film, and the PS was present as a foam.

Waste plastics B2 was a waste plastic separated from aged garbage excavated from a refuse landfill in Guangdong province and was a mixed waste plastic comprising PE, PP and a small amount of PS, PET and PVC, and the separated waste plastic was substantially free of moisture, had an ash content of about 9.9 wt % and a total chlorine content of 1.18%.

Examples II-1 to II-5

The waste plastic A2 crushed into particles was sent to a waste plastic dissolution-dechlorination unit along with a first organic solvent preheated to 65° C., dissolved at 65° C. for 60 min, the dissolution effluent was passed through a high temperature filter and separated at 65° C. into a chlorine-containing solution and a chlorine-removed waste plastic. The chlorine-removed waste plastic was further dried to recover the solvent and analyzed for chlorine content therein.

The first organic solvent used in Example II-1 was tetrahydrofuran, and the weight ratio of the first organic solvent to the waste plastic A2 was 10:1; the chlorine content in the chlorine-removed waste plastic was 23 μg/g.

The first organic solvent used in Example II-2 was methyl ethyl ketone, and the weight ratio of the first organic solvent to the waste plastic A2 was 10:1; the chlorine content in the chlorine-removed waste plastic was 25 μg/g.

The first organic solvent used in Example II-3 was a mixture of tetrahydrofuran and cyclohexanone at a weight ratio of 1:1, and the weight ratio of the first organic solvent to the waste plastic A2 was 5:1; the chlorine content in the chlorine-removed waste plastic was 22 μg/g.

The first organic solvent used in Example II-4 was a mixture of tetrahydrofuran and methyl ethyl ketone at a weight ratio of 1:1, and the weight ratio of the first organic solvent to the waste plastic A2 was 10:1; the chlorine content in the chlorine-removed waste plastic was 13 μg/g.

The first organic solvent used in Example II-5 was a mixture of tetrahydrofuran and methyl ethyl ketone at a weight ratio of 1:2, and the weight ratio of the first organic solvent to the waste plastic A2 was 10:1; the chlorine content in the chlorine-removed waste plastic was 19 μg/g.

Example II-6

The chlorine-removed waste plastic obtained in Example II-5 was sent to a waste plastic pretreatment unit, dissolved at 350° C. and 1.5 MPa for 30 min in the presence of a solvent oil and a pretreating agent for impurity removal, and the treated material was separated into an impurity-removed plastic-containing solution and an insoluble material using a high temperature filter. The plastic components of the resulting impurity-removed plastic-containing solution were PE and PP, and the solution had a concentration of the plastic components of 16.1%, a chlorine content of 2.7 μg/g, a silicon content of 3.0 μg/g, and a total metal content of 2.1 μg/g.

The solvent oil used was a distillate oil rich in aromatic hydrocarbons, which was a mixed oil of wax oil fractions obtained in petroleum processing, and had a distillation range of 220-540° C., a total aromatics content of 59.6 mass % and a monocyclic aromatics content of 21 mass %; the weight ratio of the solvent oil to the chlorine-removed waste plastic was 5:1.

The pretreating agent used was semi-coke, which had a particle size of 75-100 μm. The pretreating agent was used in an amount of 2.5 wt %, based on the total weight of the materials in the waste plastic pretreatment unit.

Example II-7

The chlorine-removed waste plastic obtained in Example II-5 was sent to a waste plastic pretreatment unit, dissolved at 350° C. and 1.5 MPa for 30 min in the presence of a solvent oil and a pretreating agent for impurity removal, and the treated material was separated into an impurity-removed plastic-containing solution and an insoluble material using a high temperature filter. The plastic components of the resulting impurity-removed plastic-containing solution were PE and PP, and the solution had a concentration of the plastic components of 16.1%, a chlorine content of 2.5 μg/g, a silicon content of 2.2 μg/g, and a total metal content of 1.2 μg/g.

The solvent oil used was catalytic cracking distillate oil that had a distillation range of 150-338° C., a total aromatics content of 76.8 mass %, and a monocyclic aromatics content of 63.8 mass %; the weight ratio of the solvent oil to the chlorine-removed waste plastic was 5:1.

The pretreating agent used was humus soil with a particle size of 75-100 μm. The pretreating agent was used in an amount of 2.5 wt %, based on the total weight of the materials in the waste plastic pretreatment unit.

Example II-8

The chlorine-removed waste plastic obtained in Example II-5 was sent to a waste plastic pretreatment unit, dissolved at 350° C. and 1.5 MPa for 30 min in the presence of a solvent oil and a pretreating agent for impurity removal, and the treated material was separated into an impurity-removed plastic-containing solution and an insoluble material using a high temperature filter. The plastic components of the resulting impurity-removed plastic-containing solution were PE and PP, and the solution had a concentration of the plastic components of 15.9%, a chlorine content of 2.5 μg/g, a silicon content of 2.5 μg/g, and a total metal content of 1.3 μg/g.

The solvent oil used was a distillate oil rich in aromatic hydrocarbons that had a distillation range of 138-362° C., a total aromatics content of 90.9 mass %, and a monocyclic aromatics content of 26.8 mass %; the weight ratio of the solvent oil to the chlorine-removed waste plastic was 5:1.

The pretreating agent used is a mixture of gasification ash and slag and FCC balanced catalyst at a weight ratio of 1:1, having a particle size of 75-100 μm. The pretreating agent was used in an amount of 2.5 wt %, based on the total weight of the materials in the waste plastic pretreatment unit.

Example II-9

The chlorine-removed waste plastic obtained in Example II-5 was sent to a waste plastic pretreatment unit, dissolved at 350° C. and 1.5 MPa for 30 min in the presence of a solvent oil and a pretreating agent for impurity removal, and the treated material was separated into an impurity-removed plastic-containing solution and an insoluble material using a high temperature filter. The plastic components of resulting impurity-removed plastic-containing solution were PE and PP, and the solution had a concentration of the plastic components of 16.1%, a chlorine content of 2.5 μg/g, a silicon content of 2.8 μg/g, and a total metal content of 1.9 μg/g.

The solvent oil used was a distillate oil rich in aromatic hydrocarbons that had a distillation range of 138-362° C., a total aromatics content of 90.9 mass %, and a monocyclic aromatics content of 26.8 mass %; the weight ratio of the solvent oil to the chlorine-removed waste plastic was 5:1.

The pretreating agent used was an FCC balanced catalyst, having a particle size of 75-100 μm. The pretreating agent was used in an amount of 2.5 wt %, based on the total weight of the materials in the waste plastic pretreatment unit.

Example II-10

The impurity-removed plastic-containing solution obtained in Example II-6 was fed to a riser reactor catalytic cracking unit and contacted with a catalytic cracking catalyst for catalytic cracking reaction, and the reaction product was separated to obtain a gas, a gasoline fraction, a diesel fraction, a heavy cycle oil and an oil slurry, and the resulting heavy cycle oil was circulated in the catalytic cracking unit.

The catalytic cracking catalyst was available from Sinopec Catalyst Co., Ltd. under the trade name of GOR-Q, the properties of the balanced catalyst thereof were as follows: a specific surface area ≥240 m$^2$/g; a bulk density >0.68 g/ml; a pore volume of >0.34 ml/g; a wear resistance ≤2.8%/h; a micro-activity ≥76% measured at 800° C. for 4 h; an average particle size of 70-75 μm; $Al_2O_3$≥46%; and $Re_2O_3$≥3%.

The catalytic cracking conditions included a temperature of 500° C., a pressure of 0.15 MPa, a catalyst-to-oil ratio of 4, and a reaction time of 2.02 s.

The product yields obtained are shown in Table 1. As the decomposition products of organosilicon are mainly octamethylcyclotetrasiloxane and decamethylcyclopentasiloxane and are mainly concentrated in the gasoline fraction, the content of impurities in the gasoline fraction is mainly analyzed.

Example II-11

The impurity-removed plastic-containing solution obtained in Example II-7 was sent to a riser reactor catalytic cracking unit, together with a catalytic cracking feedstock VGO at a weight ratio of the impurity-removed plastic-containing solution to the VGO of 1:1, and contacted with a catalytic cracking catalyst for catalytic cracking reaction, and the reaction product was separated to obtain a gas, a gasoline fraction, a diesel fraction, a heavy cycle oil and an oil slurry, and the resulting heavy cycle oil was circulated in the catalytic cracking unit.

The catalytic cracking catalyst used was GOR-Q, and the catalytic cracking conditions included a temperature of 500° C., a pressure of 0.15 MPa, a catalyst-to-oil ratio of 4, and a reaction time of 2.02 s.

The product yields obtained are shown in Table 1.

TABLE 1

Results of the examples

| Feedstock | | Example II-10 | Example II-11 |
|---|---|---|---|
| | | Impurity-removed plastic-containing solution obtained in Example II-6 | Impurity-removed plastic-containing solution obtained in Example II-7 + VGO |
| Product yields, wt % | Dry gas | 1.3 | 1.1 |
| | Liquefied gas | 16.5 | 12.8 |
| | Gasoline fraction | 55.3 | 57.6 |
| | Diesel fraction | 15.3 | 16.1 |
| | Oil slurry | 4.7 | 8.6 |
| | Coke | 6.9 | 3.8 |
| Content of impurities in gasoline fraction/ ($\mu$g/g) | Cl | <0.5 | <0.5 |
| | Si | <0.5 | <0.5 |

Example II-12

The waste plastic B2 was sent to an intermittent heat-exchanger type dryer through a conveyor belt, the heat source used was low-grade steam, the temperature of the dryer was 105° C., and the residence time of the waste plastic in the dryer was 30 min; the dried waste plastic was sent, through a conveyor belt, to a shear type crusher with a mesh diameter of 10 mm. The crushed waste plastic was passed to an external heating kettle-type dissolving kettle of a waste plastic dissolution-dechlorination unit through a screw feeder, meanwhile a mixed solvent of methyl ethyl ketone and tetrahydrofuran at a ratio of 2:1 was also sent to the external heating kettle-type dissolving kettle through a metering pump at a weight ratio of the waste plastic to the solvent of 1:5. In the dissolving kettle, the dissolving temperature was 65° C., the operation pressure was normal pressure, and the rotating speed of stirring paddle was 60 r/min. After a dissolution of the waste plastic B2 in the dissolving kettle was conducted for 30 min, the solvent was replaced with a fresh solvent for a next dissolution, until the dissolution was conducted for three times with a total time of 90 min. The dissolving kettle comprised two kettles connected in parallel, the mixture was passed to a high temperature filter through a discharge port at the bottom of the dissolving kettle, and the mixture was separated into a chlorine-removed waste plastic and a chlorine-containing solution at 65° C. The chlorine-containing solution was subjected to flash evaporation to recover the first organic solvent and a chlorine-containing waste plastic.

The chlorine-removed waste plastic was dried at a temperature of 80° C. to further recover the first organic solvent, and then sent to an external heating kettle-type dissolving kettle of a waste plastic pretreatment unit through a screw feeder, a solvent oil was sent to the external heating kettle-type dissolving kettle through a metering pump at a weight ratio of the waste plastic to the solvent oil of 1:10, and a waste FCC balanced catalyst was sent to the external heating kettle-type dissolving kettle through the metering pump at a weight ratio of the pretreating agent to the waste plastic of 1:10. The impurity removal treatment temperature was 390° C., the operation pressure was 0.5 MPa, the rotating speed of stirring paddle was 60 r/min, and the residence time of the chlorine-removed waste plastic in the dissolving kettle was 30 min. The dissolving kettle comprised two kettles connected in parallel; and the treated mixture was passed to a high temperature filter through a discharge port at the bottom of the dissolving kettle, and filtered to remove insoluble impurities at 350° C. to obtain an impurity-removed plastic-containing solution. The plastic components in the impurity-removed plastic-containing solution were mainly PE and PP, and the solution had a concentration of the plastic components of about 8.7%, a chlorine content of 2.2 $\mu$g/g, a silicon content of 1.7 $\mu$g/g, and a total metal content of 3.6 $\mu$g/g.

The impurity-removed plastic-containing solution was sent to a riser reactor catalytic cracking unit using a single-screw pump, contacted with a catalytic cracking catalyst for catalytic cracking reaction, and the reaction product was separated to obtain a gas, a gasoline fraction, a diesel fraction, an oil slurry and semicoke.

The solvent oil was catalytic cracking distillate oil that had a distillation range of 150-338° C., a total aromatics content of 76.8 mass %, and a monocyclic aromatics content of 63.8 mass %.

The catalytic cracking catalyst was GOR-Q, the catalytic cracking conditions included a temperature of 500° C., a pressure of 0.15 MP a, a catalyst-to-oil ratio of 4, and a reaction time of 2.02 s.

The product yields and the content of some impurities are shown in Table 2.

Example II-13

The experiment was carried out using the same waste plastic B2 raw material, first organic solvent and treatment conditions for waste plastic dissolution-dechlorination unit, solvent oil, pretreating agent and treatment conditions for waste plastic pretreatment unit, catalyst and reaction conditions for catalytic cracking unit as in Examples 11-12, except that: the feedstock fed to the catalytic cracking unit was a mixed feedstock of the impurity-removed plastic-containing solution and a catalytic cracking feedstock, i.e. VGO from Shengli Oilfield (Shengli VGO), at a weight ratio of 1:1, and the catalytic cracking unit was a conventional circulating fluidized bed equipment.

In this example, the deactivated catalyst was regenerated in a regenerator, and, by using the replacement amount of the catalyst required for treating 1t of feedstock oil while maintaining a steady operation of the equipment as an index, the replacement amount of the catalytic cracking catalyst in this example was 1.2 kg/t.

The product yields and the content of some impurities are shown in Table 2.

Comparative Example II-1

Shengli VGO was reacted in a catalytic cracking unit using the same catalyst and reaction conditions as in Example II-12. The product yields and the content of some impurities are shown in Table 2.

Comparative Example II-2

The experiment was carried out using the same waste plastic B2 raw material, first organic solvent and treatment conditions for waste plastic dissolution-dechlorination unit, solvent oil and treatment conditions for waste plastic pretreatment unit, feedstock, catalyst and reaction conditions for catalytic cracking unit as in Examples 11-13, except that: no pretreating agent was used in the waste plastic pretreatment unit.

The displacement amount of the catalytic cracking catalyst in this comparative example was 1.22 kg/t.

The product yields and the content of some impurities are shown in Table 2.

TABLE 2

Results of the examples and comparative examples

| | | Example No. | | | |
|---|---|---|---|---|---|
| | | Comp. Ex. II-1 | Comp. Ex. II-2 | Ex. II-12 | Ex. II-13 |
| Feedstock to catalytic cracking unit | | Shengli VGO | Impurity-removed plastic-containing solution + Shengli VGO | Impurity-removed plastic-containing solution | Impurity-removed plastic-containing solution + Shengli VGO |
| Product yields/wt % | Dry gas | 1.8 | 2.1 | 2.1 | 2.1 |
| | Liquefied gas | 9.9 | 12.7 | 12.9 | 12.7 |
| | Gasoline | 52.9 | 52.4 | 52.5 | 52.3 |
| | Diesel oil | 24.8 | 21.4 | 19.8 | 21.3 |
| | Oil slurry | 5.3 | 4.7 | 5.5 | 4.7 |
| | Coke | 4.6 | 6.6 | 6.6 | 6.8 |
| Content of impurities in gasoline fraction/ ($\mu$g/g) | Cl | <0.5 | <0.5 | <0.5 | <0.5 |
| | Si | <0.5 | 878 | <0.5 | <0.5 |

From the results shown in Table 2, it can be seen that the method and system of the present application can greatly reduce the relative content of harmful elements in the resulting oil product, and produce a qualified product oil. It should be noted that, due to the addition of some plastic in the VGO, the yield of dry gas, liquefied gas and coke in the FCC unit is slightly increased, while the yield of gasoline and diesel oil is slightly decreased.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application.

In addition, the various embodiments of the present application can be arbitrarily combined as long as the combination does not depart from the spirit of the present application, and such combined embodiments should be considered as the disclosure of the present application.

The invention claimed is:

1. A method for pretreating waste plastics, comprising the steps of:

1) contacting a waste plastic with a pretreating agent and a solvent oil for impurity removal, wherein the pretreating agent is chosen from humus soil, red mud, waste catalyst from oil-refining unit, kaolin, semicoke, activated carbon, gasification ash and slag, or combinations thereof; and 2) subjecting the effluent of step 1) to solid-liquid separation to obtain an insoluble material and an impurity-removed plastic-containing solution, the impurity-removed plastic-containing solution has a metal content of less than 5 $\mu$g/g, a chlorine content of less than 20 $\mu$g/g and a silicon content of less than 3 $\mu$g/g, wherein step 1) is carried out at a treatment temperature of 250-410° C. under a pressure of 0.1-5 MPa for a treatment time of 10-60 min; and the solvent oil used in step 1) has a distillation range of 80-550° C., a total aromatics content of greater than 50 mass % and a monocyclic aromatics content of greater than 20 mass %.

2. The method according to claim 1, having one or more of the following characteristics:

the treatment conditions of step 1) include: a treatment temperature of 320-390° C.; a pressure of 0.5-4.0 MPa; and a treatment time of 15-45 min;

the solvent oil used in step 1) has a monocyclic aromatics content of greater than 40 mass %;

the weight ratio of the solvent oil to the waste plastic used in step 1) is 1:10 to 10:1;

the pretreating agent used in step 1) is selected from selected from waste catalytic cracking catalyst, humus soil, activated carbon, or combinations thereof, and comprises an alkaline oxide the pretreating agent used in step 1) has a particle size in a range of 75-150 $\mu$m;

the weight ratio of the pretreating agent to the waste plastic used in step 1) is 1:10 to 2:1; and the waste plastic used in step 1) is washed, dried and crushed in advance, and the crushed waste plastic has a particle size of 1-200 mm.

3. The method according to claim 1, wherein the operating temperature of the solid-liquid separation of step 2) is 250-410° C.; and the impurity-removed plastic-containing solution has a metal content of less than 3 $\mu$g/g, a chlorine content of less than 1 $\mu$g/g, and a silicon content of less than 1 $\mu$g/g.

4. The method according to claim 1, wherein at least a part of the waste plastic used in step 1) is a chlorine-removed waste plastic, and the chlorine-removed waste plastic is produced from a dechlorination treatment comprising the steps of:
 i) dissolving a raw waste plastic in a first organic solvent selected from tetrahydrofuran, ketone solvents, chlorinated aliphatic hydrocarbons, or combinations thereof; and
 ii) subjecting the mixture obtained in step i) to solid-liquid separation to obtain a chlorine-containing solution and the chlorine-removed waste plastic.

5. The method according to claim 4, wherein, in step i):
 the dissolving in the first organic solvent is carried out at 50-100° C. for 30-60 min; and/or
 the first organic solvent is a mixed solvent of tetrahydrofuran and a ketone solvent at any weight ratio, wherein the ketone solvent is chosen from methyl ethyl ketone, methyl isobutyl ketone, cyclohexanone, isophorone, or combinations thereof; and/or
 a weight ratio of the first organic solvent to the raw waste plastic is 1:10 to 10:1.

6. The method according to claim 4, wherein the dechlorination treatment further comprises the steps of:
 iii) subjecting the chlorine-containing solution obtained in step ii) to a precipitation treatment and separation, to obtain plastic particles and recovered first organic solvent, wherein the precipitation treatment is chosen from back-extraction, simple distillation, flash evaporation, rectification, or combinations thereof.

7. The method according to claim 1, further comprising the step of:
 3) Contacting the insoluble material obtained in step 2) with a second organic solvent for solvent extraction, and subjecting the resulting product to solid-liquid separation to obtain a solid material and a liquid material, wherein the second organic solvent is chosen from benzene, toluene, trichloromethane, cyclohexanone, ethyl acetate, butyl acetate, carbon disulfide, tetrahydrofuran, gasoline, or combinations thereof;
 4) Treating the solid material obtained in step 3) to recover the pretreating agent, and recycling at least a part of the recovered pretreating agent to step 1), wherein the treatment is chosen from screening, regenerating, or combinations thereof; and
 5) Subjecting the liquid material obtained in step 3) to a precipitation treatment and separation to obtain solid plastic particles and recovered second organic solvent, wherein the precipitation treatment is chosen from back-extraction, simple distillation, flash evaporation, rectification, or combinations thereof.

8. The method according to claim 1, wherein the waste plastic is chosen from waste plastics in fresh domestic garbage, waste plastics from industrial and agricultural production, waste plastics in aged garbage, or combinations thereof, and the waste plastic comprises one or more selected from polyethylene (PE), polypropylene (PP), polystyrene (PS) and polyvinyl chloride (PVC) plastics, or combinations thereof.

9. A method for producing an automotive fuel from waste plastics, comprises the steps of:
 I) carrying out the method according to claim 1, to obtain an impurity-removed plastic-containing solution;
 II) contacting the impurity-removed plastic-containing solution and an optional catalytic cracking feedstock with a catalytic cracking catalyst for reaction; and
 III) separating the reaction product of step II) to obtain a gasoline fraction and/or a diesel fraction.

10. The method according to claim 9, wherein the catalytic cracking catalyst used in step II) comprises a zeolite, an inorganic oxide binder, and optionally a clay;
 based on the total weight of the catalyst, the zeolite is present in an amount of 5-50 wt %, the inorganic oxide is present in an amount of 5-90 wt %, and the clay is present in an amount of 0-70 wt %; and
 the zeolite is chosen from the group consisting of rare earth-containing or rare earth-free Y or HY zeolites, rare earth-containing or rare earth-free ultrastable Y zeolites, zeolites having MFI structure, or combinations thereof.

11. The method according to claim 9, wherein the reaction conditions used in step II) include: a reaction temperature of 460-530° C., a reaction pressure of 0.1-0.4 MPa, a catalyst-to-oil ratio of 5-10, and a reaction time of 2-4 s.

\* \* \* \* \*